Nov. 23, 1954  C. A. SHORT, JR., ET AL  2,695,014
CONTROL OF AIRCRAFT ENGINES
Filed Nov. 12, 1948  22 Sheets-Sheet 1
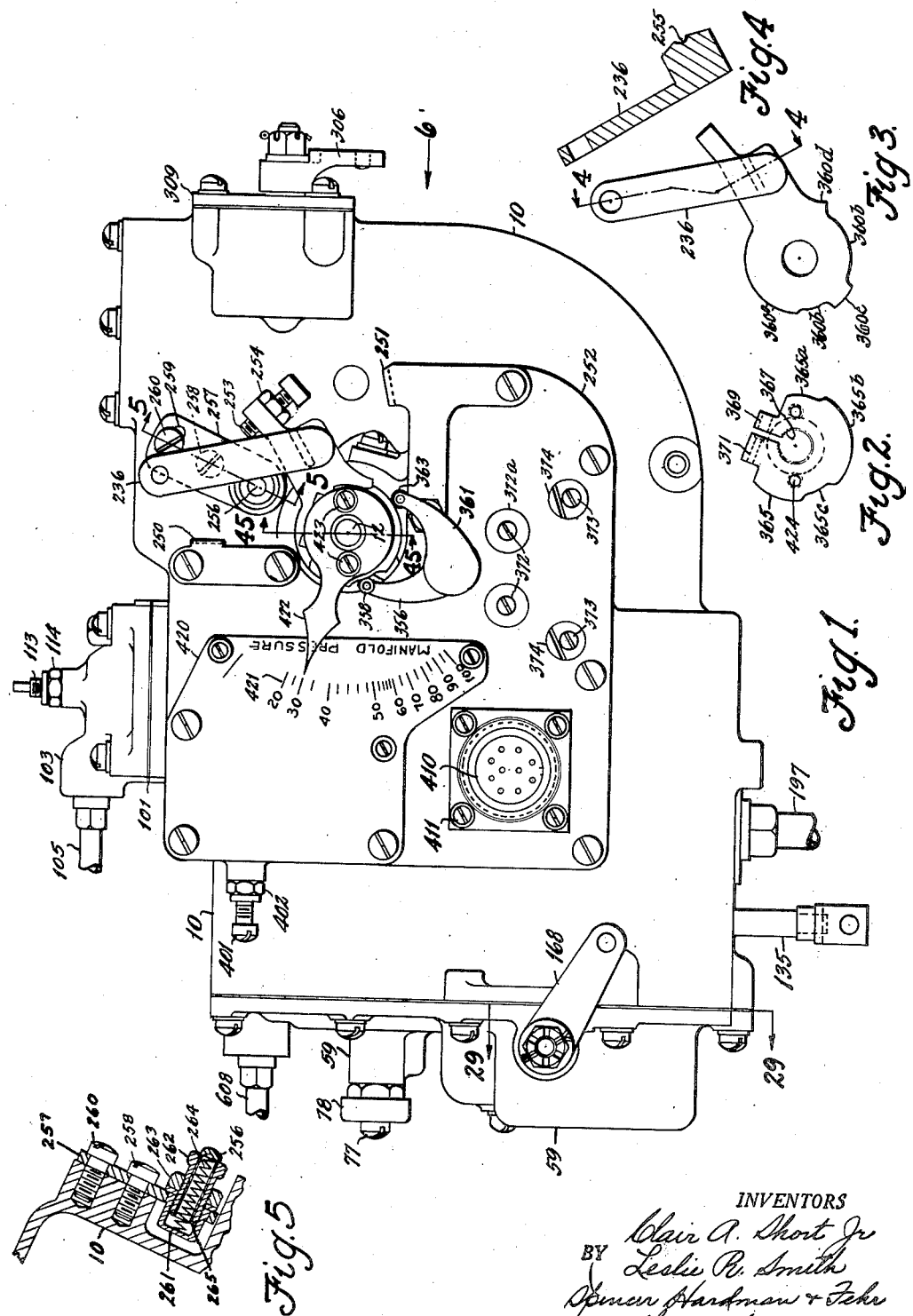
INVENTORS
Clair A. Short Jr
BY Leslie R. Smith
Spencer Hardman & Fehr
their attorneys

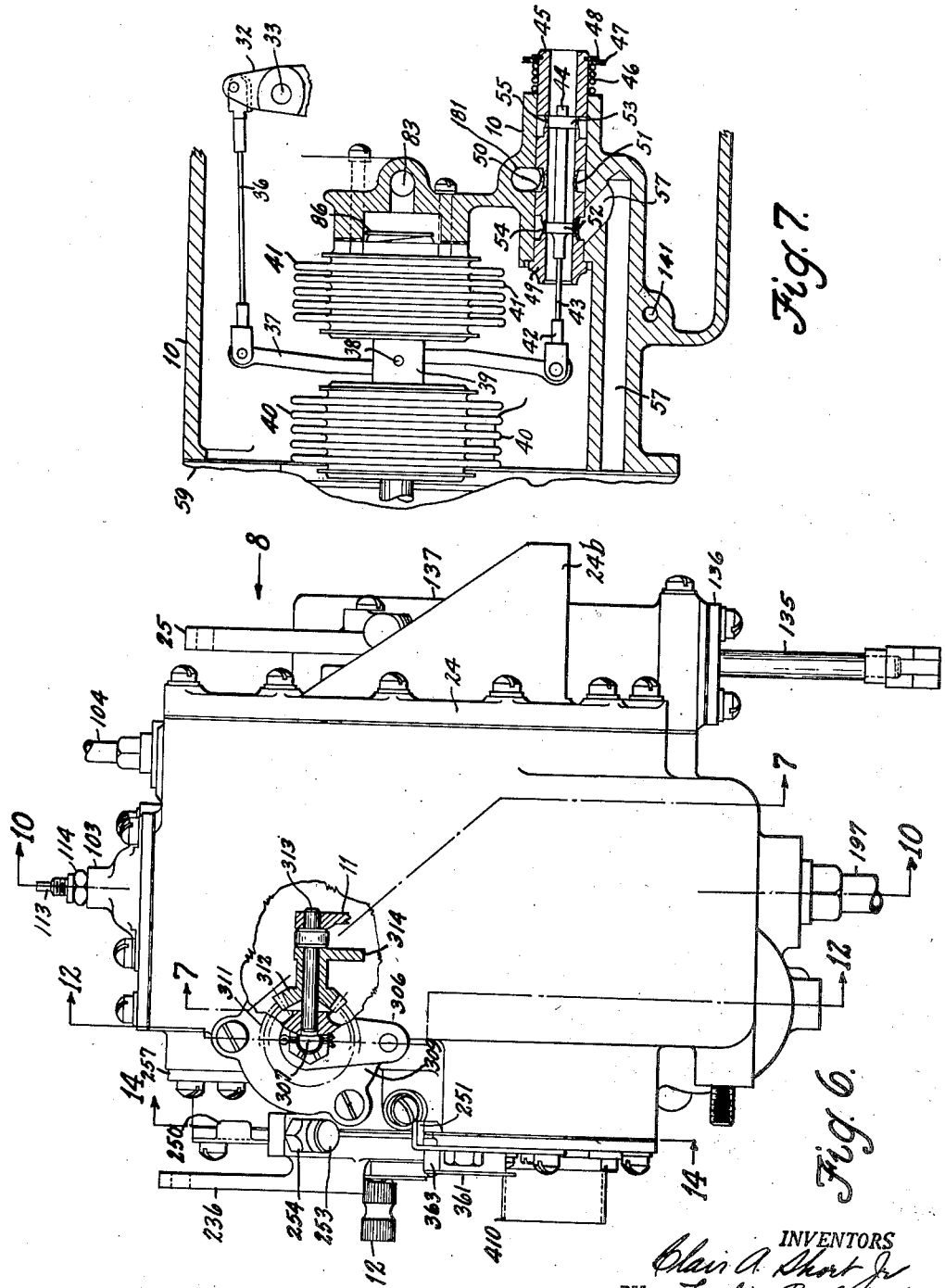

Nov. 23, 1954
C. A. SHORT, JR., ET AL
2,695,014
CONTROL OF AIRCRAFT ENGINES
Filed Nov. 12, 1948
22 Sheets-Sheet 3
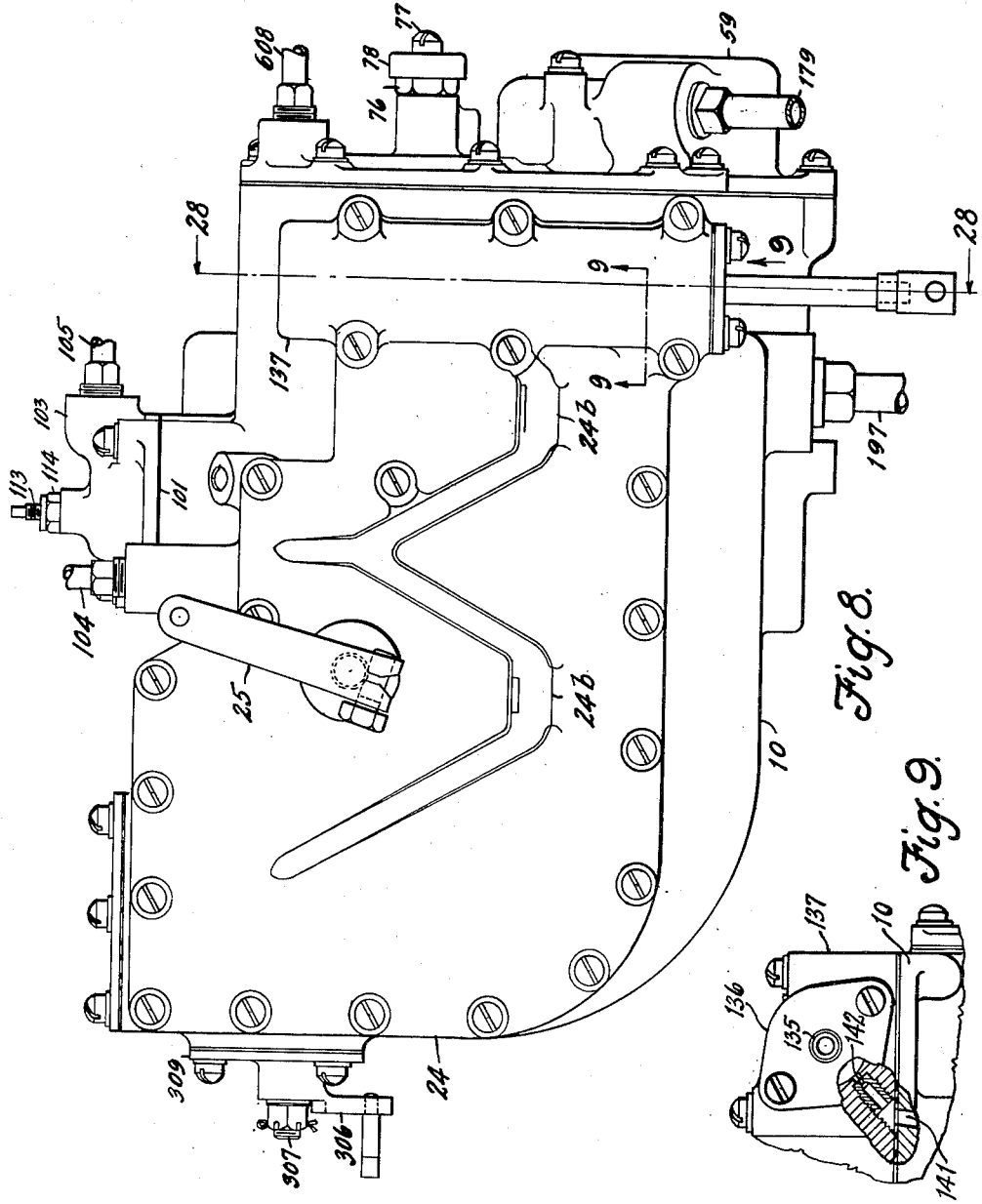
INVENTORS
Clair A. Short Jr
BY Leslie R. Smith
Spencer Hardman & Fehr
their attorneys Nov. 23, 1954     C. A. SHORT, JR., ET AL     2,695,014
CONTROL OF AIRCRAFT ENGINES
Filed Nov. 12, 1948     22 Sheets-Sheet 4
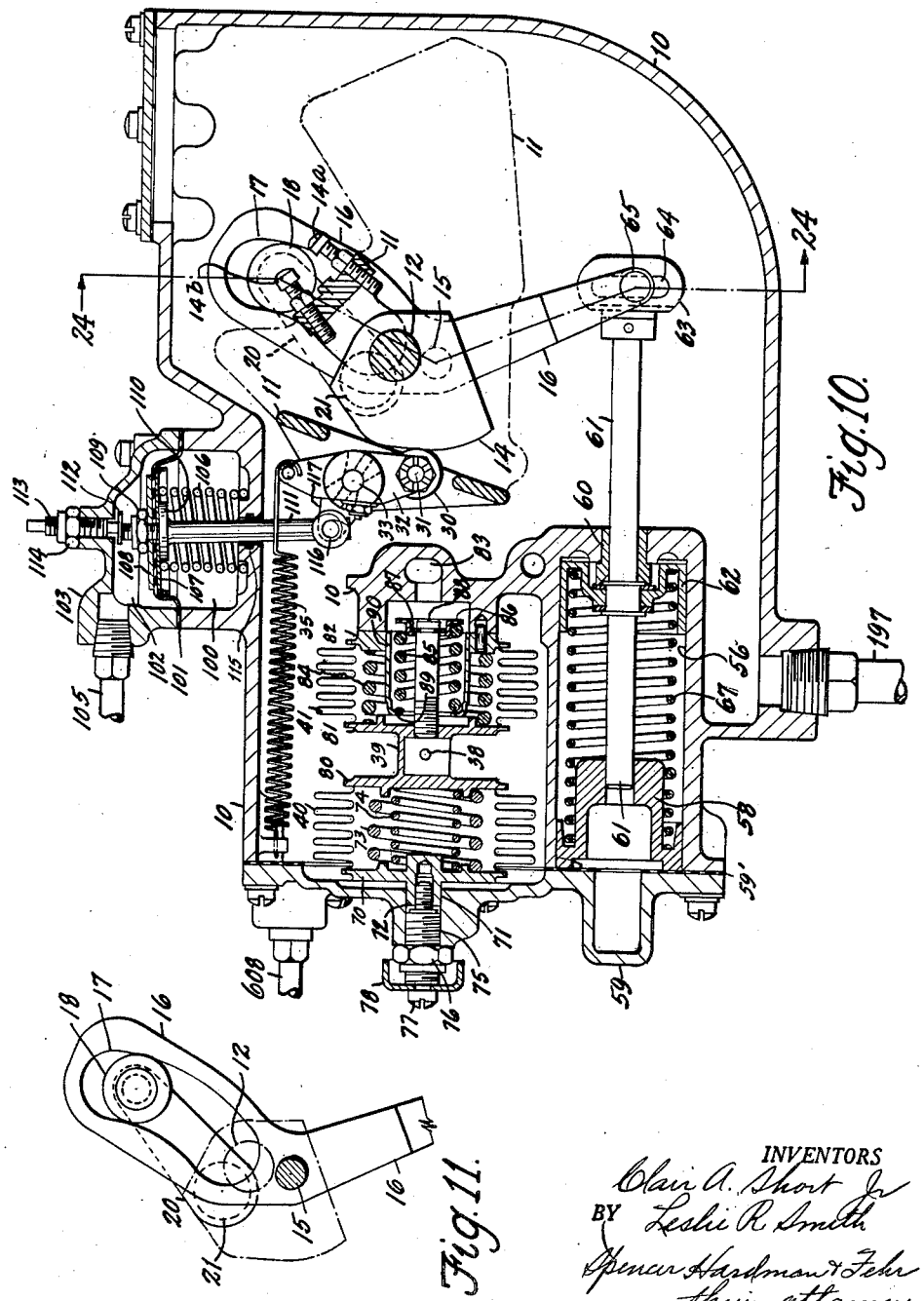

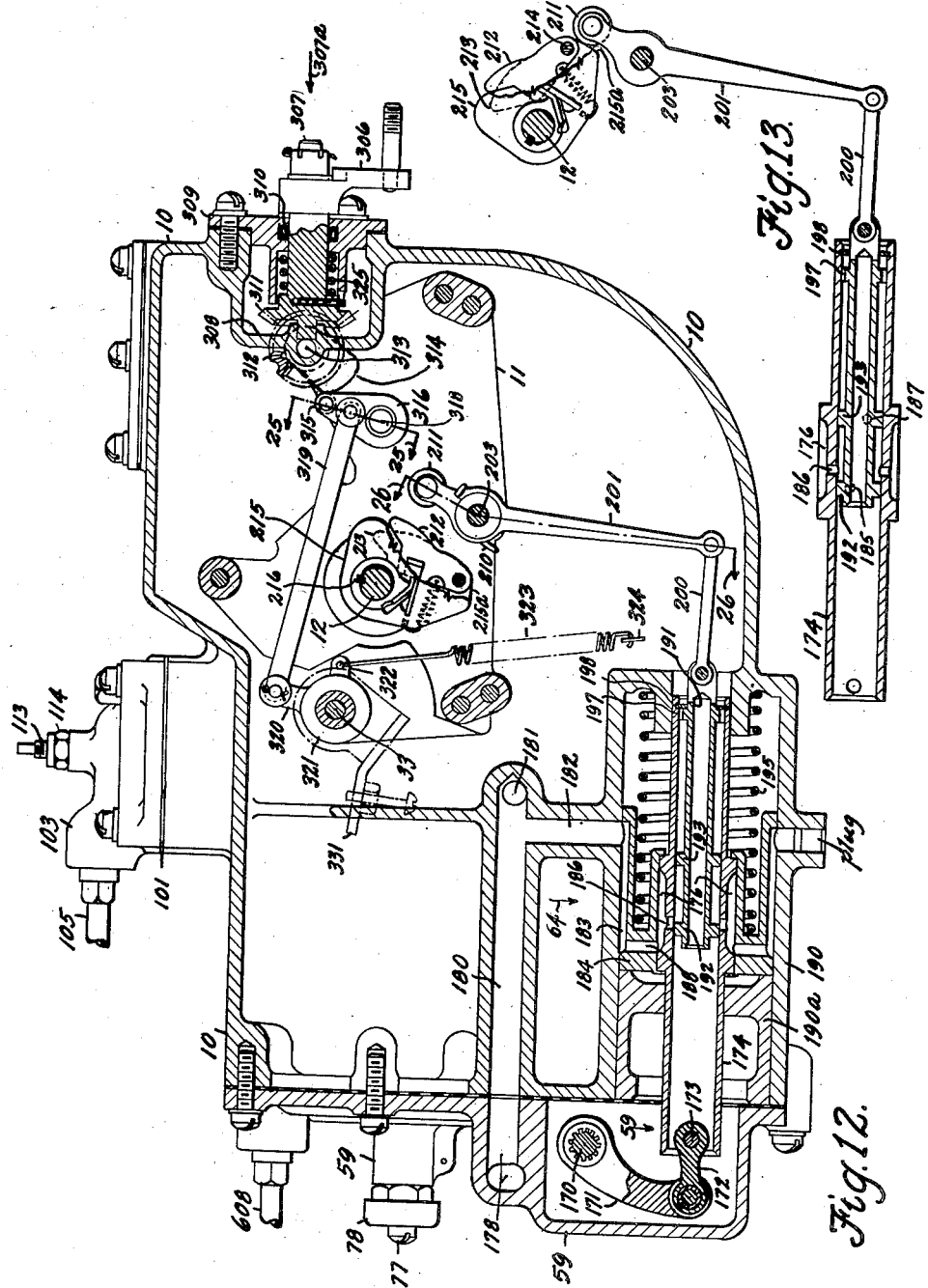

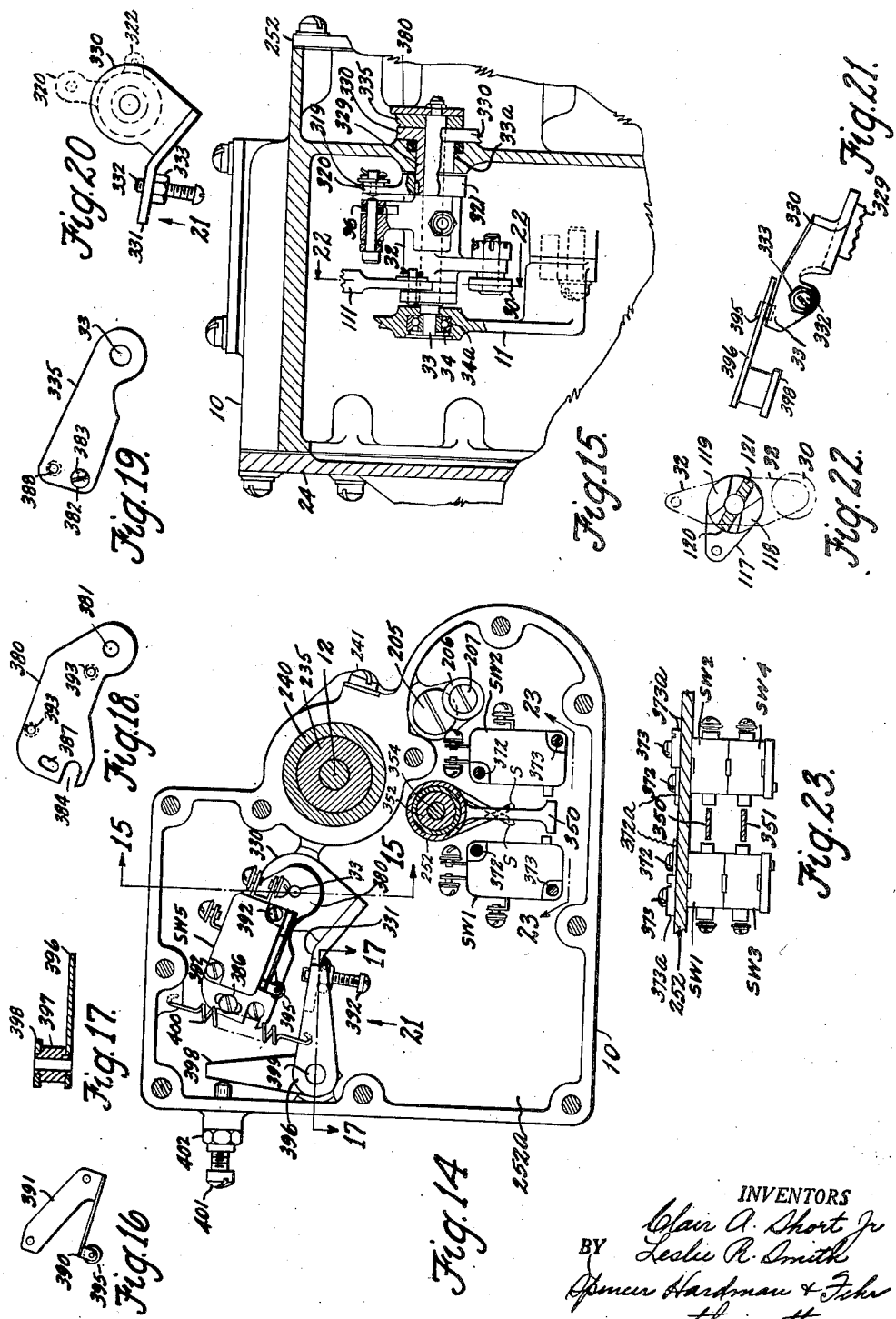

Nov. 23, 1954
C. A. SHORT, JR., ET AL
2,695,014
CONTROL OF AIRCRAFT ENGINES
Filed Nov. 12, 1948
22 Sheets-Sheet 7
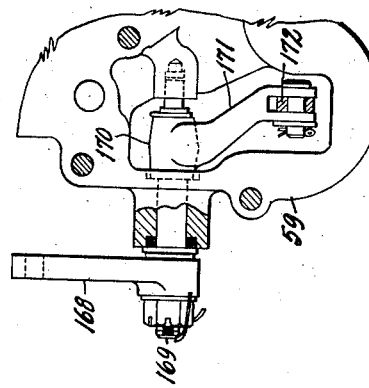
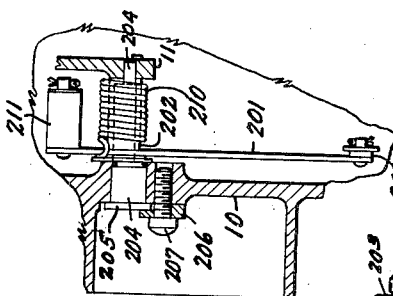
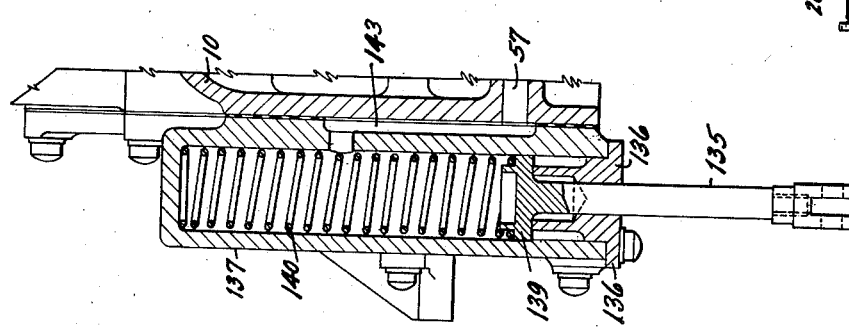
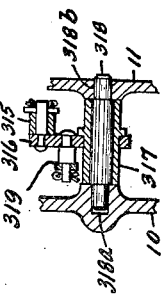
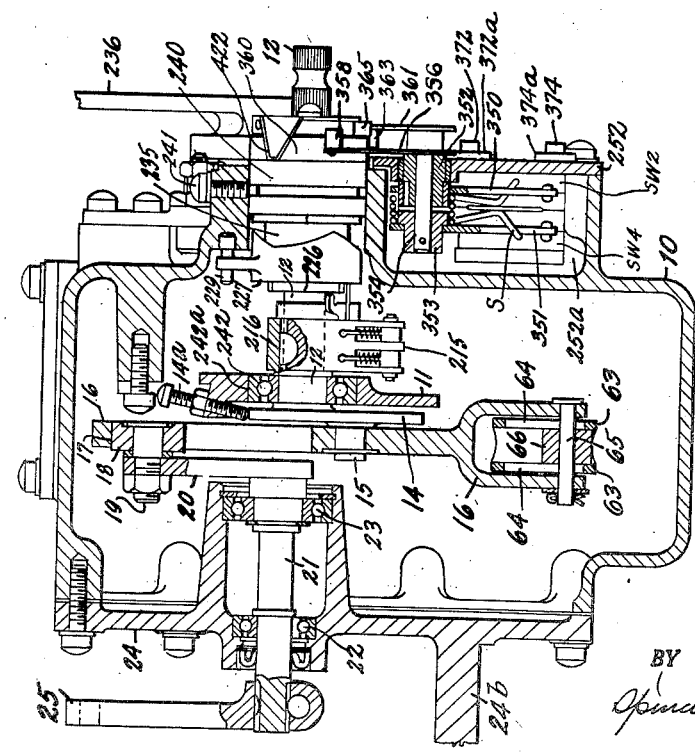
INVENTORS
Clair A. Short Jr
BY Leslie R. Smith
Spencer Hardman & Febr
their attorneys

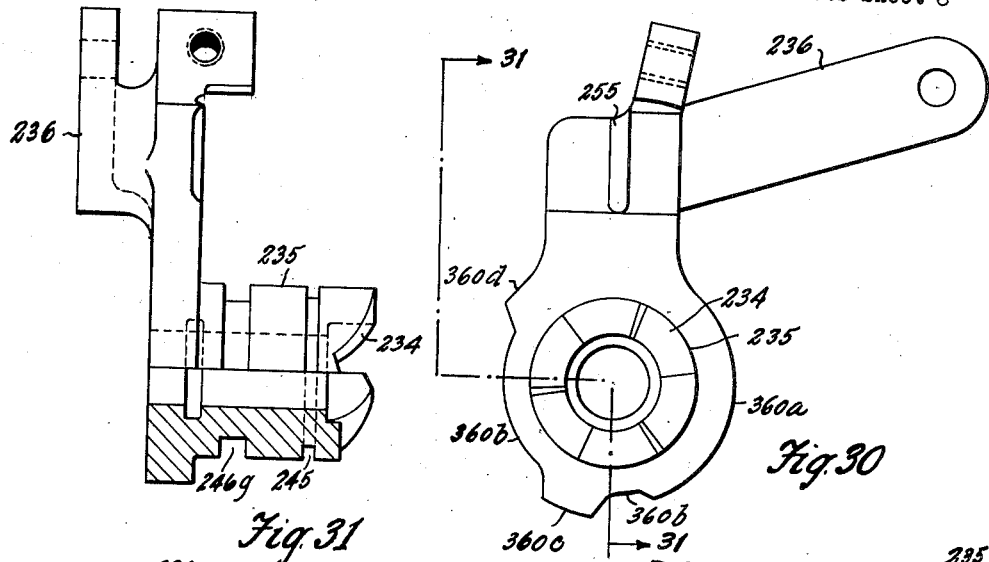
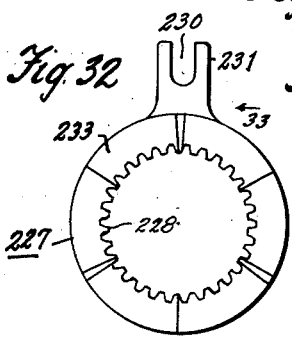
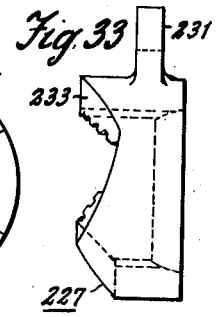
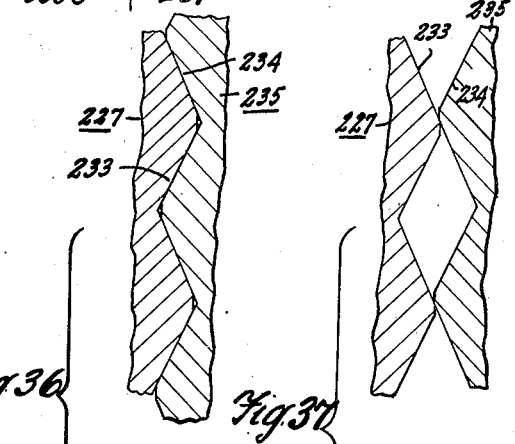
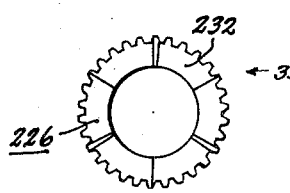
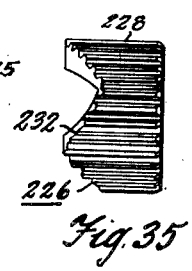
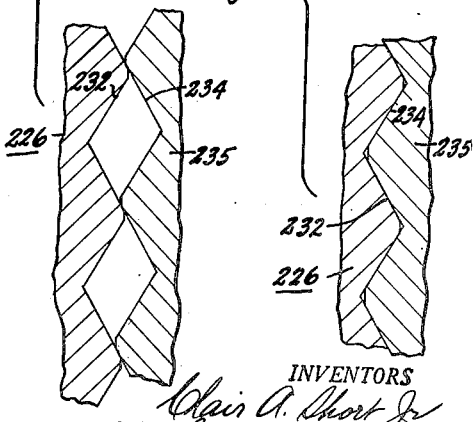

Nov. 23, 1954
C. A. SHORT, JR., ET AL
2,695,014
CONTROL OF AIRCRAFT ENGINES
Filed Nov. 12, 1948
22 Sheets-Sheet 9
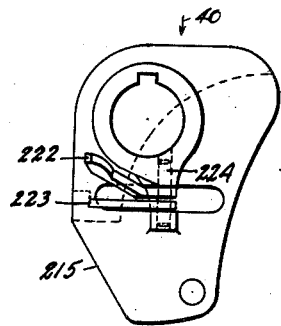
Fig. 38
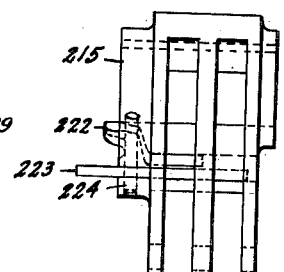
Fig. 39
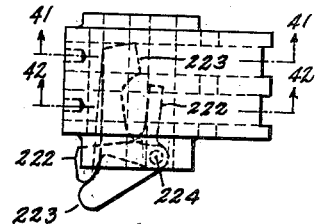
Fig. 40
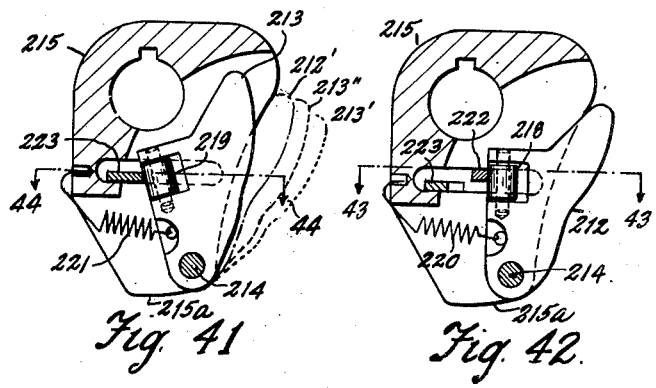
Fig. 41
Fig. 42
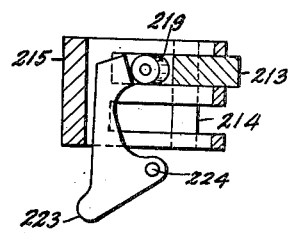
Fig. 43
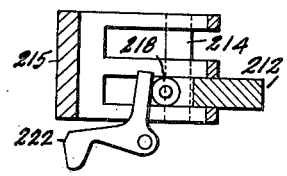
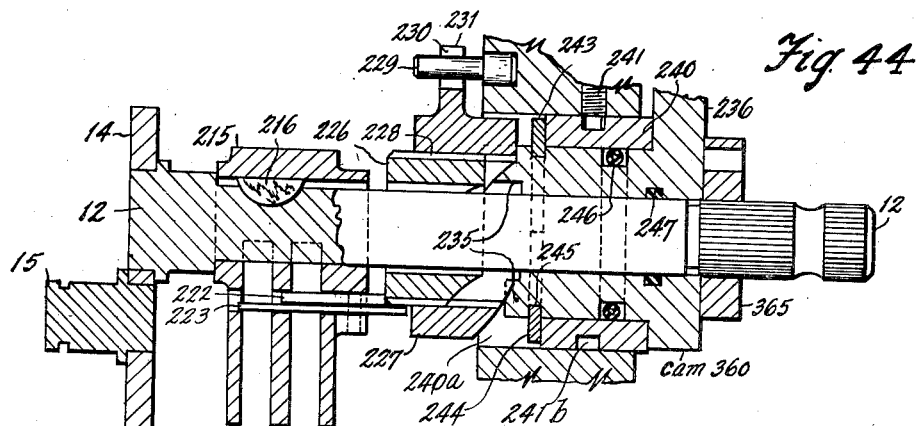
Fig. 45
INVENTORS
Clair A. Short Jr
Leslie R. Smith
BY Spencer Hardman & Feller
their attorneys

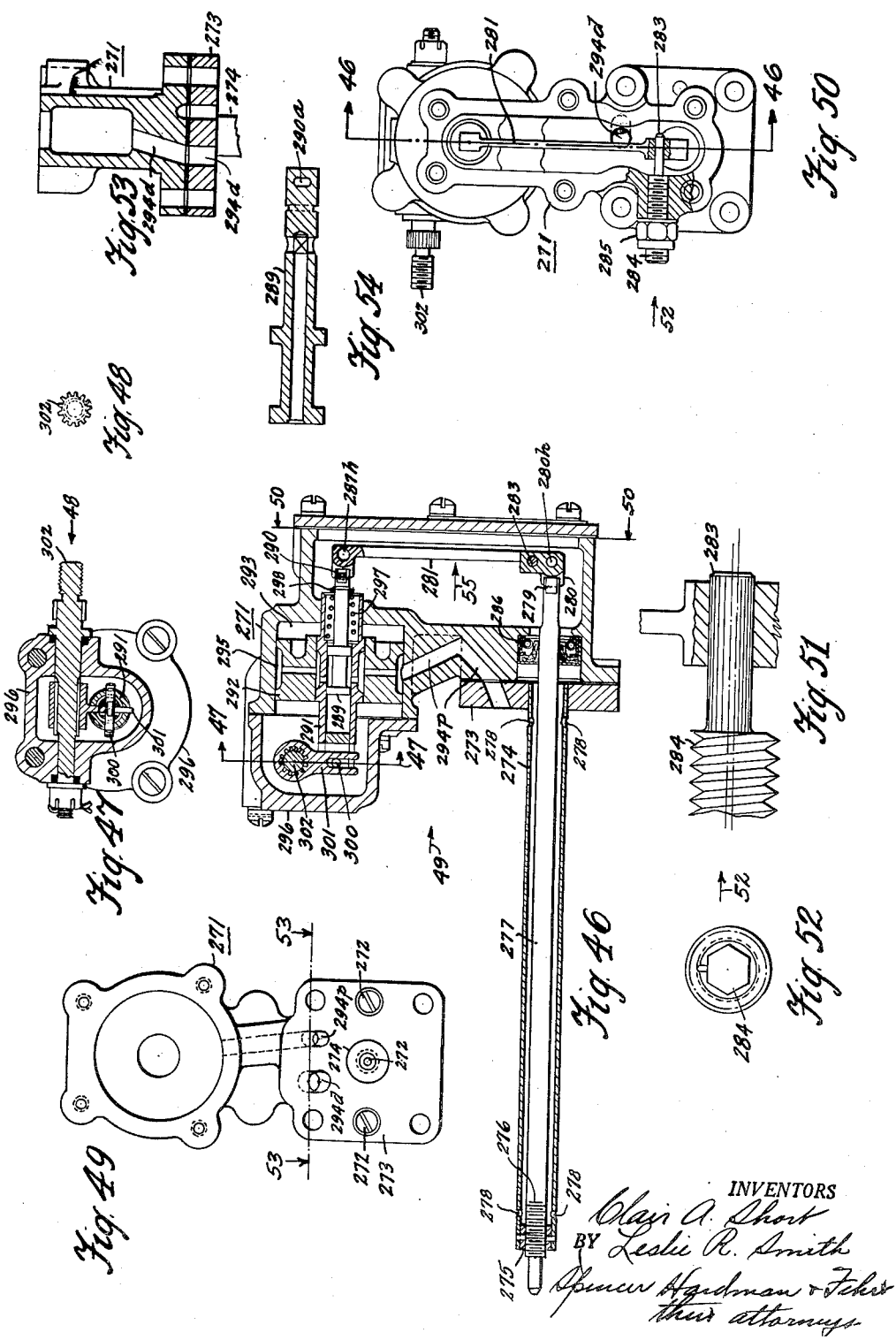

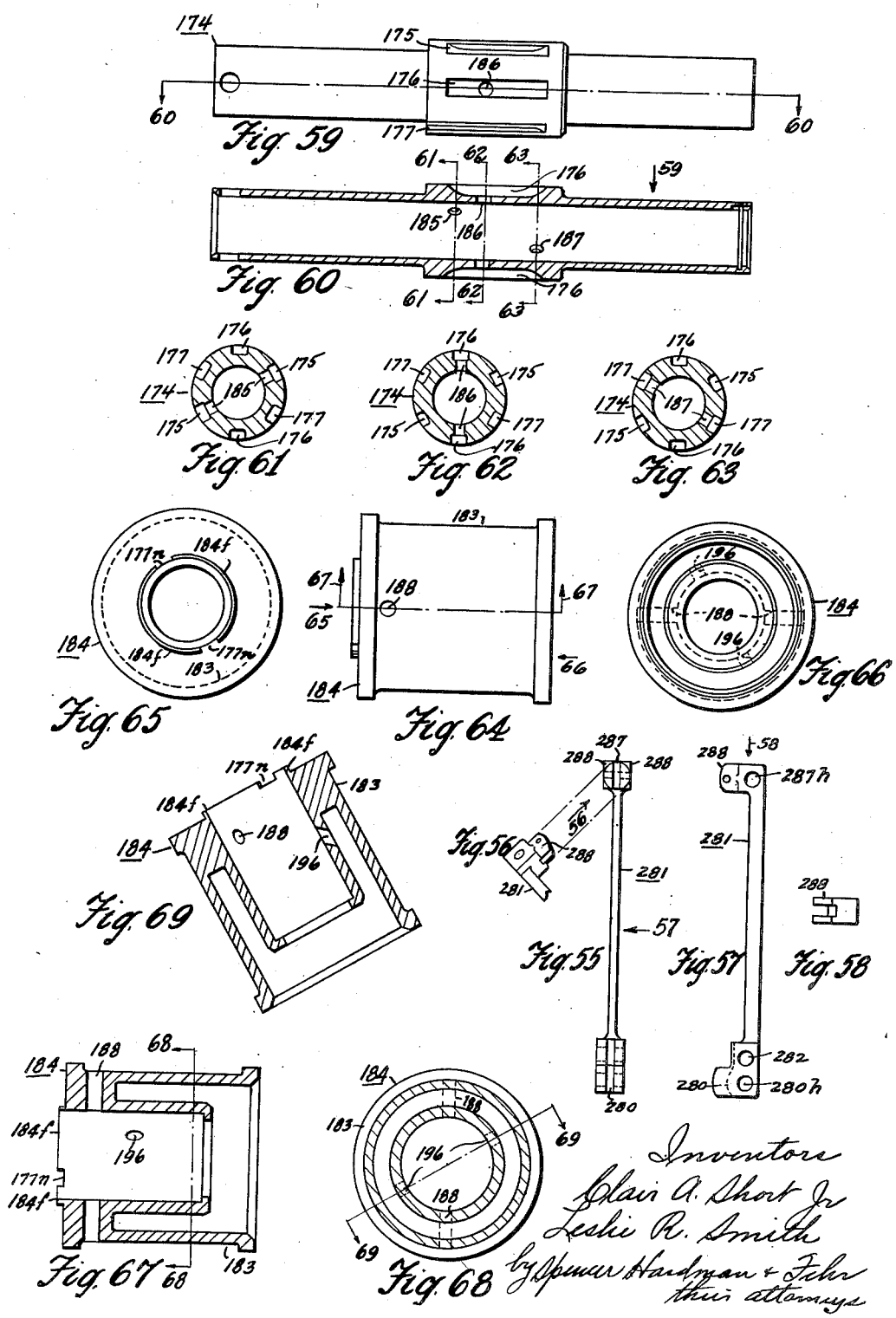

Nov. 23, 1954
C. A. SHORT, JR., ET AL
2,695,014
CONTROL OF AIRCRAFT ENGINES
Filed Nov. 12, 1948
22 Sheets-Sheet 12
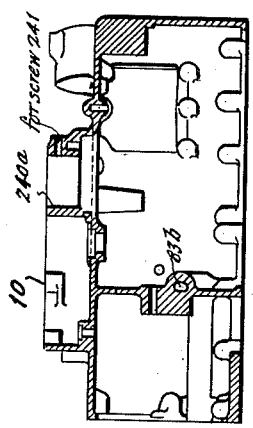
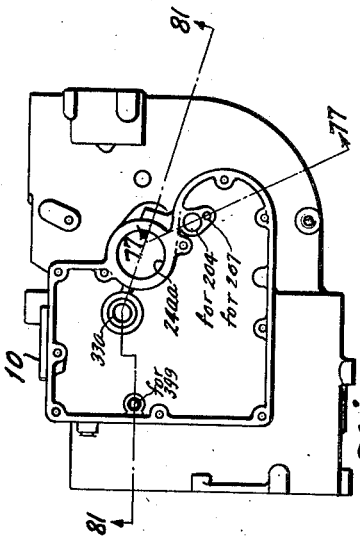
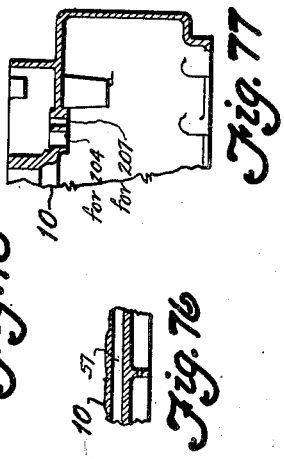
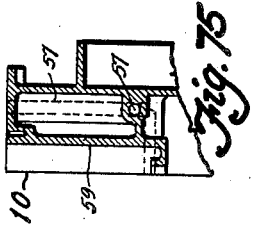
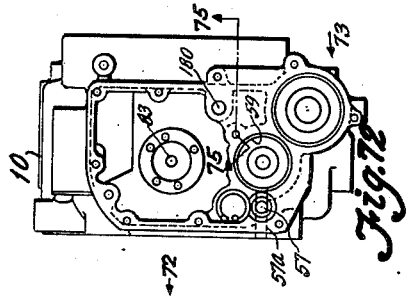
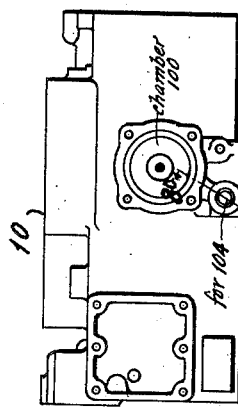
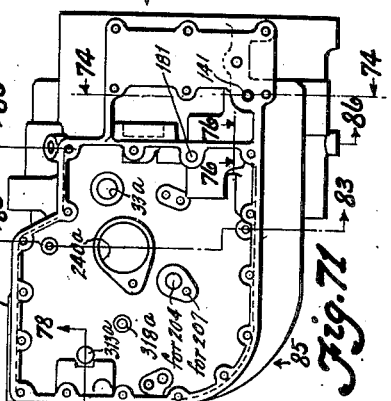
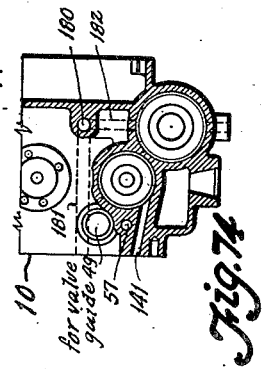
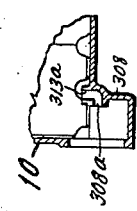
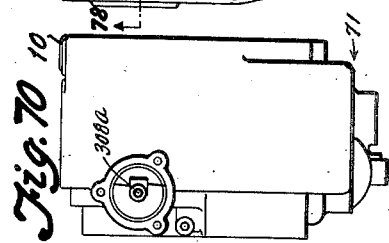

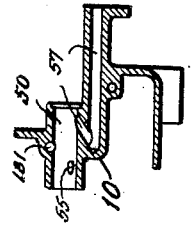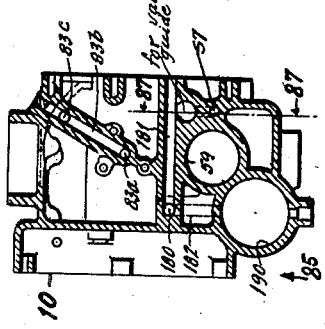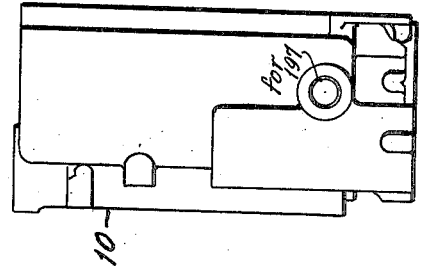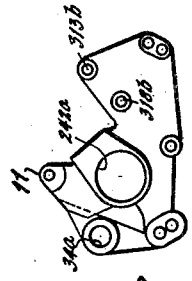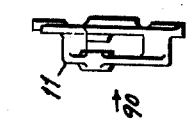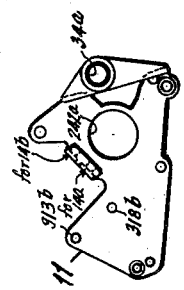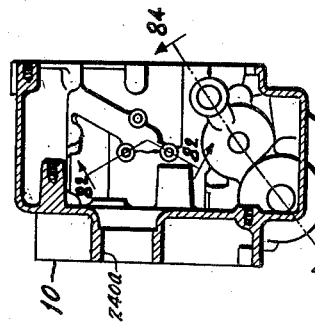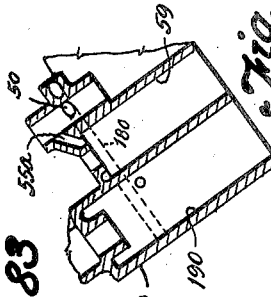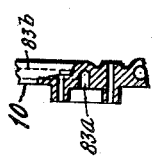

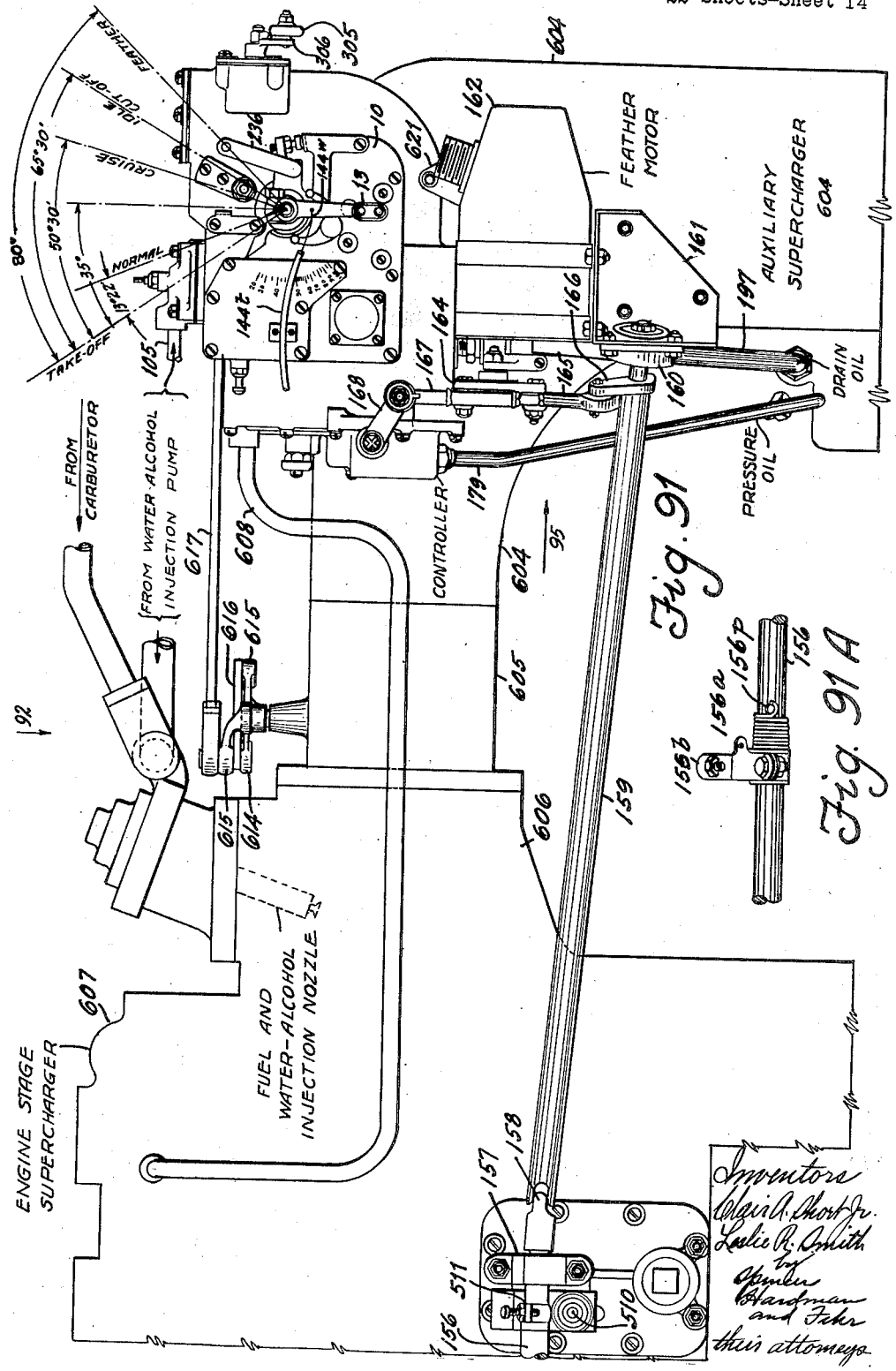

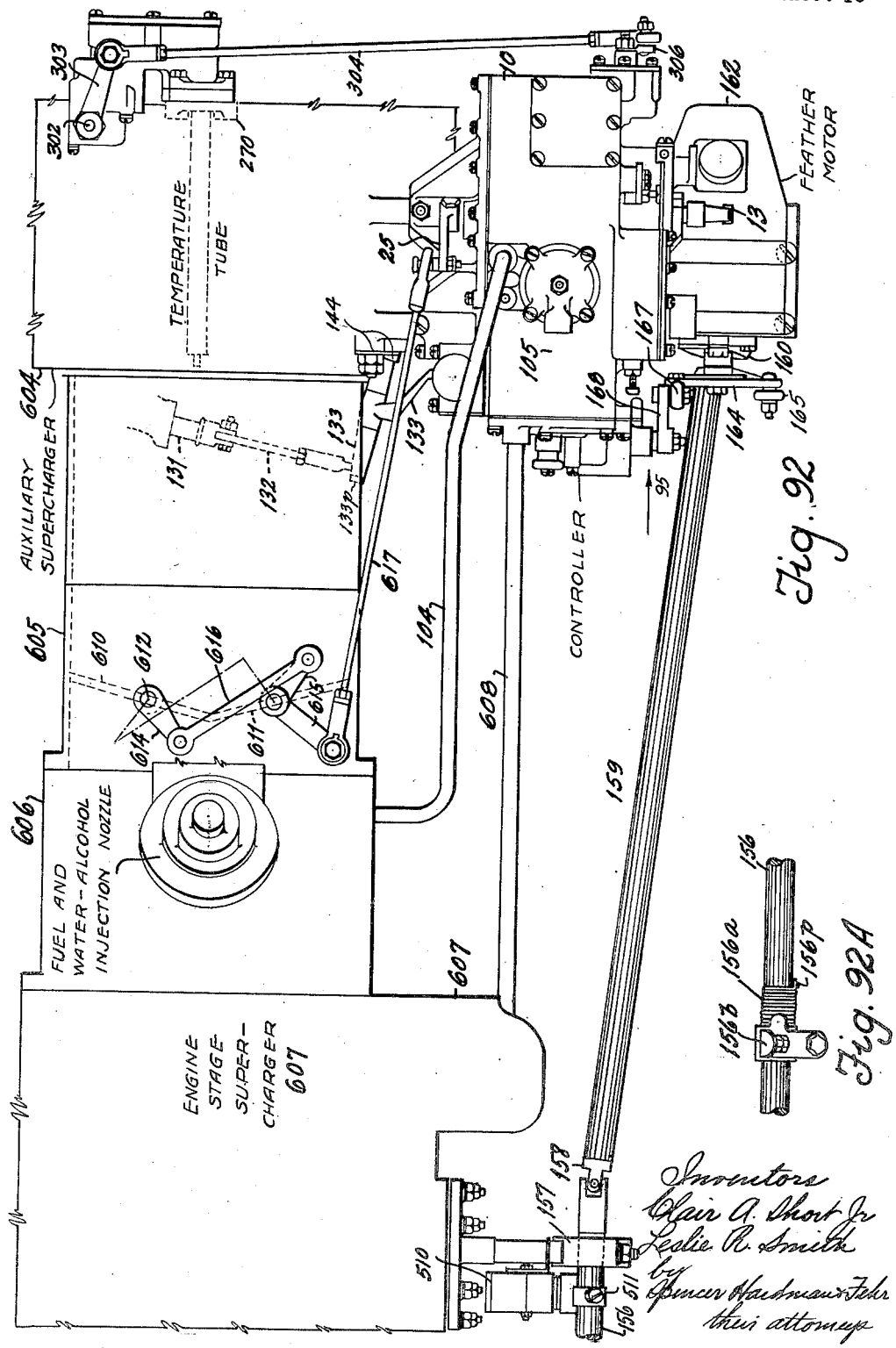

Nov. 23, 1954  C. A. SHORT, JR., ET AL  2,695,014
CONTROL OF AIRCRAFT ENGINES
Filed Nov. 12, 1948  22 Sheets-Sheet 16
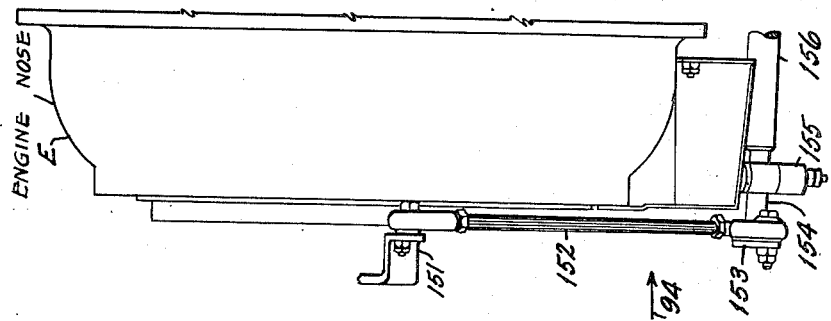
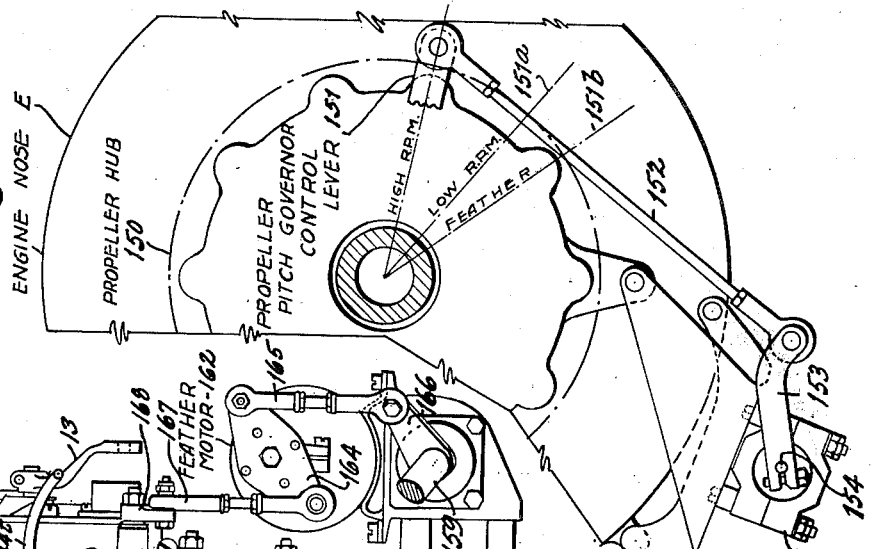
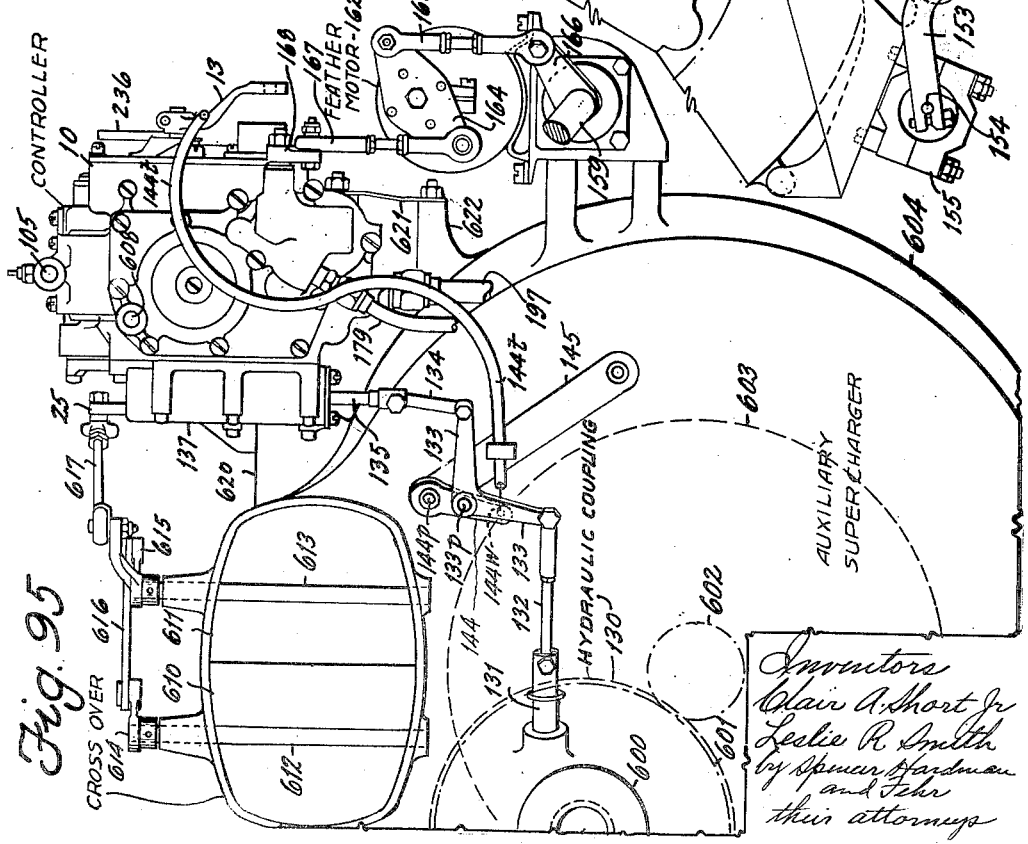

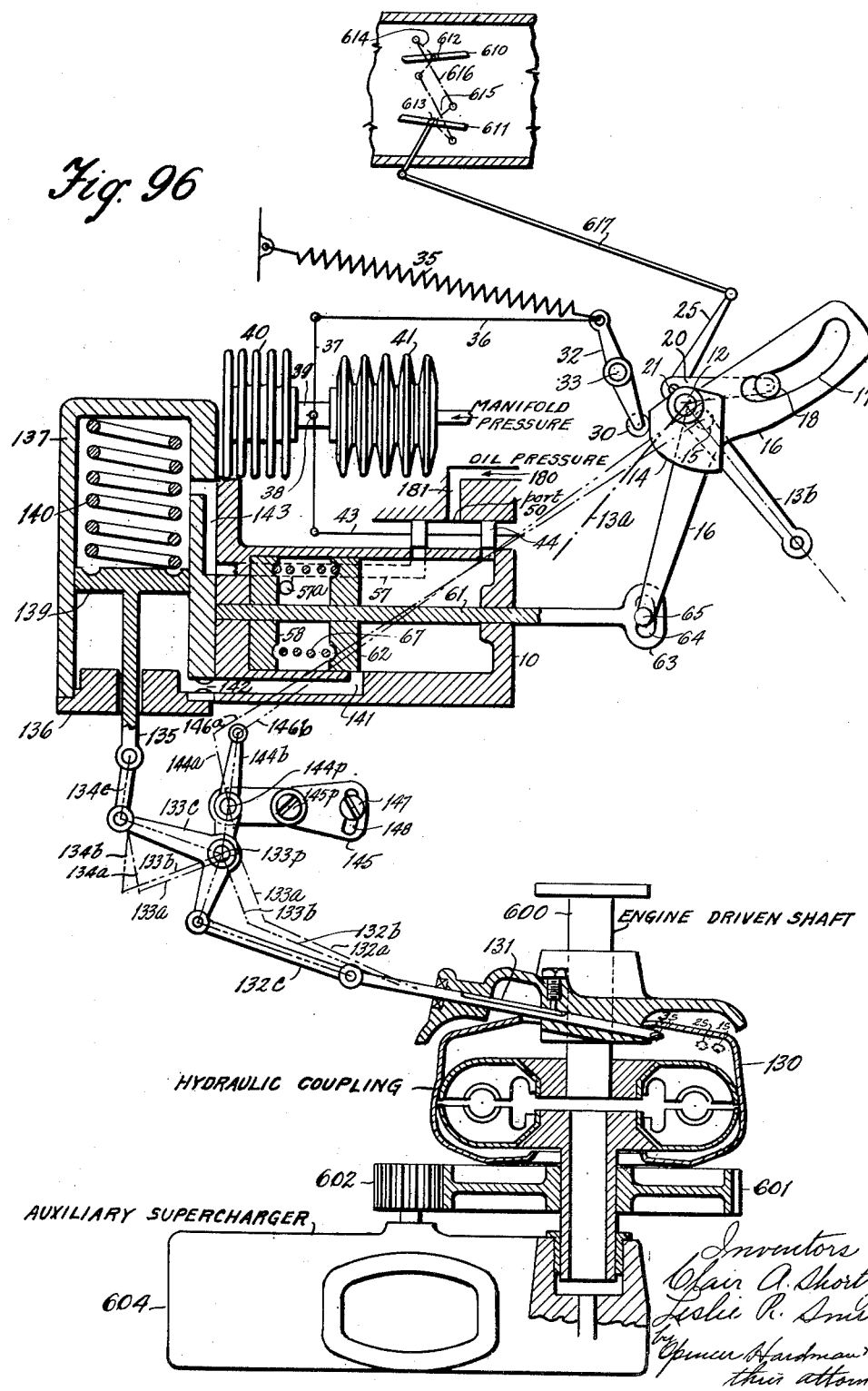

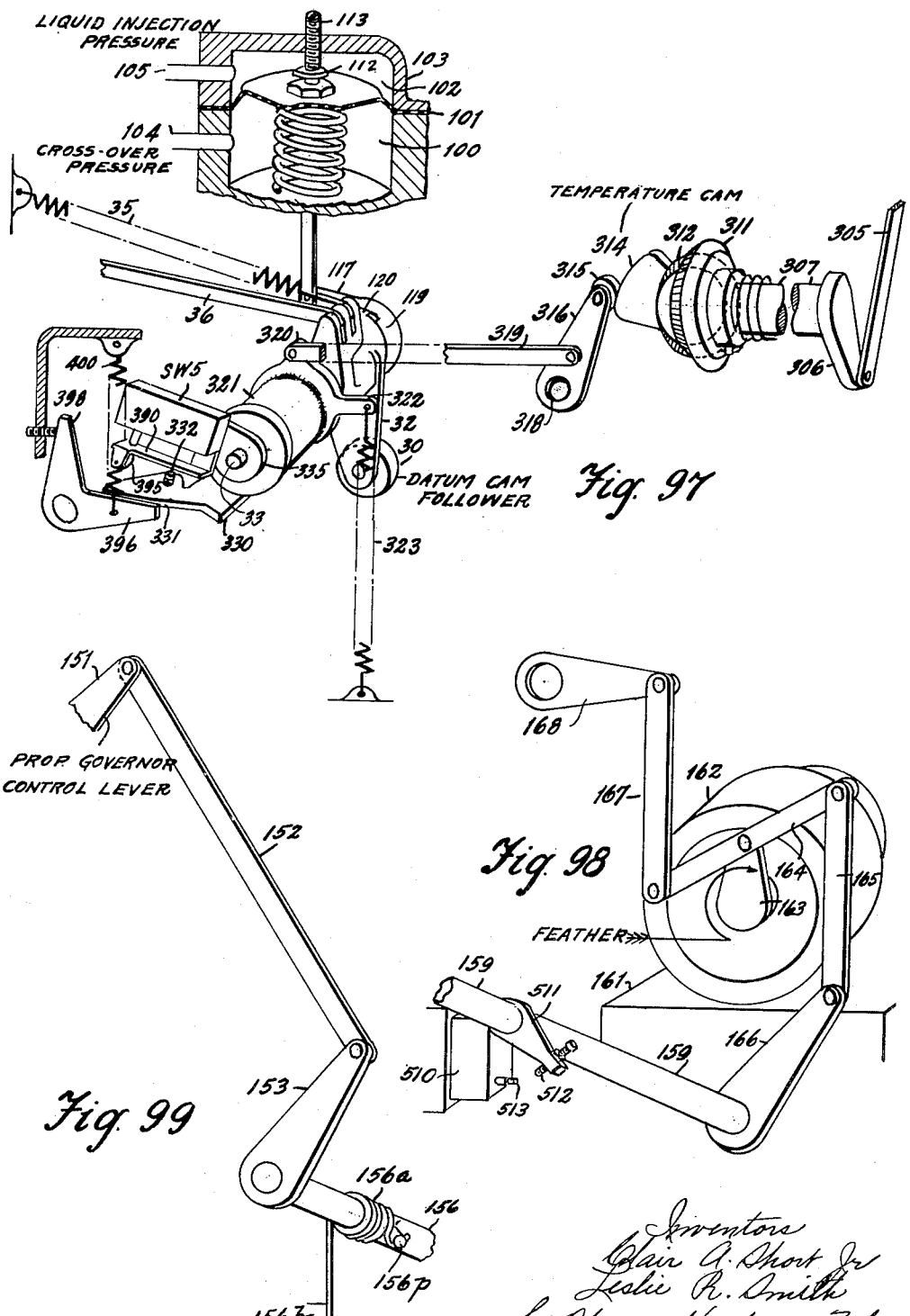

Nov. 23, 1954  C. A. SHORT, JR., ET AL  2,695,014
CONTROL OF AIRCRAFT ENGINES
Filed Nov. 12, 1948  22 Sheets-Sheet 20

United States Patent Office 2,695,014
Patented Nov. 23, 1954

2,695,014

CONTROL OF AIRCRAFT ENGINES

Clair A. Short, Jr., and Leslie R. Smith, Indianapolis, Ind., assignors to General Motors Corporation, Detroit, Mich., a corporation of Delaware Application November 12, 1948, Serial No. 59,644

14 Claims. (Cl. 123—179)

This invention relates to controls for aircraft reciprocating-type engines equipped with main and auxiliary superchargers and driving variable pitch propellers and provided with apparatus for injecting liquid into the fuel mixture in order to permit operation of the engine without detonation at manifold pressures which otherwise would cause detonation if fuel mixture temperature were not reduced.

The objects of the invention include the provision of a control by which a selected manifold pressure is automatically maintained by adjustment of the throttle valve up to wide open position and thereafter by increase of speed of the auxiliary supercharger, by which the obtainable pressure is normally limited to a value such that detonation will not occur during engine operation without liquid injection, by which operation of the liquid injection apparatus is effected automatically by means jointly controlled by pressure selection and temperature of the air-for-fuel-mixture so that, when the air temperature is close to a value such that detonation would occur when a certain manifold pressure exists and the engine operates without liquid injection, the injection apparatus operates; and by which operation of the liquid injection apparatus is effected automatically by means controlled solely by pressure selection so that, although the air temperature might be too low to be a detonation factor, when the selected pressure is close to a value such that detonation would occur during engine operation, the injection apparatus operates; and, in case of exhaustion of the supply of injection liquid or failure of the injection apparatus to function, the obtainable manifold pressure is limited to a safe value regardless of the demand pressure. The control of the injection apparatus jointly by air-temperature and pressure selection provides for maintaining the limit on obtainable manifold pressure until the injection apparatus has begun to function.

A further object is to provide a control by which a plurality of schedules of speed in relation to selected manifold pressure can be selected namely, a speed vs. manifold pressure schedule for take-off and landing, a schedule for normal operation and a schedule for cruising and by which there are obtained the required ignition spark retard during engine starting and idling and spark advance for normal operation, for cruise and for operation during the functioning of the liquid injection apparatus.

A further object is to provide a spark advance controlling apparatus under control by electromagnets which are respectively under control by use of the engine starter or selection of idling manifold pressure, by functioning of the liquid injection apparatus and by a control jointly effected through the selection of the cruise speed vs. manifold pressure schedule and selection of manifold pressures in the cruise range.

A further object is to provide a control by which feathering of propeller blades and the closing of the engine fuel valve is effected and by which the fuel valve is opened and the blades are caused to return from feathering to a normal blade-angle range.

Further objects and advantages of the present invention will be apparent from the following description, reference being had to the accompanying drawings, wherein a preferred form of embodiment of the present invention is clearly shown.

In the drawings:

Fig. 1 is a front view of the controller.
Fig. 2 is a front view of the cam 365 shown in Fig. 1.
Fig. 3 is a front view of a speed-schedule selecting lever 236 shown in Fig. 1.
Fig. 4 is a sectional view on line 4—4 of Fig. 3.
Fig. 5 is a sectional view on line 5—5 of Fig. 1.
Fig. 6 is a view in the direction of the arrow 6 of Fig. 1.
Fig. 7 is a sectional view on line 7—7 of Fig. 6.
Fig. 8 is a rear view of the machine, said view being in the direction of arrow 8 of Fig. 6.
Fig. 9 is a view in the direction of arrow 9 of Fig. 8, a portion thereof being in section on line 9—9 of Fig. 8.
Fig. 10 is a sectional view on the line 10—10 of Fig. 6.
Fig. 11 is a fragmentary view of the differential lever 16 and throttle shaft operating arm 20 cooperating therewith.
Fig. 12 is a sectional view on line 12—12 of Fig. 6.
Fig. 13 is a fragmentary view showing certain parts of Fig. 12 in other positions.
Fig. 14 is a sectional view on the line 14—14 of Fig. 6.
Fig. 15 is a sectional view on line 15—15 of Fig. 14.
Fig. 16 is a front view of a bracket 391 of Fig. 14.
Fig. 17 is a sectional view on line 17—17 of Fig. 14.
Fig. 18 is a front view of a switch mounting plate 380 of Fig. 14.
Fig. 19 is a view of a switch carrying lever 335 of Fig. 15.
Fig. 20 is a view of a stop lever 330 of Fig. 14.
Fig. 21 is a view in the direction of arrow 21 of Fig. 14.
Fig. 22 is a sectional view on line 22—22 of Fig. 15.
Fig. 23 is a sectional view on line 23—23 of Fig. 14.
Fig. 24 is a sectional view on line 24—24 of Fig. 10.
Fig. 25 is a sectional view on line 25—25 of Fig. 12.
Fig. 26 is a sectional view on line 26—26 of Fig. 12.
Fig. 27 is a view showing an adjusting stud 204 of Fig. 26 eccentrically supporting a lever 201 shown in section.
Fig. 28 is a sectional view on line 28—28 of Fig. 8.
Fig. 29 is a view on line 29—29 of Fig. 1.
Fig. 30 is a view of a speed schedule selecting modifier lever 236 shown in Fig. 24, looking in the direction opposite to that shown in Fig. 1.
Fig. 31 is a view on line 31—31 of Fig. 30.
Fig. 32 is an end view of normal sleeve 227 shown in Fig. 24.
Fig. 33 is a side view in the direction of arrow 33 of Fig. 32.
Fig. 34 is an end view of the cruise sleeve 226 shown in Fig. 24.
Fig. 35 is a view in the direction of arrow 35 of Fig. 34.
Fig. 36 is a diagram showing the relations of the normal sleeve and the cruise sleeve relative to the modifier lever in one position of the latter.
Fig. 37 is a diagram similar to Fig. 36 showing the relations of the normal sleeve and the cruise sleeve to the modifier lever in another position of the latter.
Fig. 38 is an end view of a carrier 215 shown in Fig. 24 which supports the normal cam blade 213 and the cruise cam blade 212.
Fig. 39 is a view in the direction of arrow 39 of Fig. 38.
Fig. 40 is a view in the direction of arrow 40 of Fig. 38.
Fig. 41 is a sectional view on line 41—41 of Fig. 40 and shows the normal cam 213 in various positions and the cruise cam 212 in operating position in dot-dash lines.
Fig. 42 is a sectional view on line 42—42 of Fig. 40 and shows the cruise cam 212 in operating position.
Fig. 43 is a sectional view on line 43—43 of Fig. 42 and shows the normal cam and its positioning lever.
Fig. 44 is a view similar to Fig. 43 and shows the cruise cam and its positioning lever.
Fig. 45 is a sectional view on line 45—45 of Fig. 1, showing the speed schedule control.
(Figs. 31 through 45 are drawn to a larger scale than the preceding figures.)
Fig. 46 is a longitudinal, sectional view on line 46—46 of Fig. 50 of a device responsive to temperature of air for fuel mixture.
Fig. 47 is a sectional view on line 47—47 of Fig. 46.

Fig. 48 is an end view of a shaft 302 in the direction of arrow 48 of Fig. 47.

Fig. 49 is a view in the direction of arrow 49 of Fig. 46.

Fig. 50 is a sectional view on line 50—50 of Fig. 46 and shows an adjusting screw 284.

Fig. 51 is a fragmentary view of an enlargement of the adjusting screw 284 of Fig. 50.

Fig. 52 is a view in the direction of arrow 52 of Fig. 51.

Fig. 53 is a sectional view on line 53—53 of Fig. 50.

Fig. 54 is an enlarged, longitudinal, sectional view of the valve 289 in Fig. 46.

Fig. 55 is a view of a lever 281 in the direction of arrow 55 of Fig. 46.

Fig. 56 is a fragmentary view in the direction of arrow 56 of Fig. 55.

Fig. 57 is a view in the direction of arrow 57 of Fig. 55.

Fig. 58 is a view in the direction of arrow 58 of Fig. 57.

Fig. 59 is a side view of the valve sleeve 174 of the speed servo shown in Fig. 12. Fig. 59 is in the direction of arrow 59 of Fig. 60.

Fig. 60 is a sectional view on line 60—60 of Fig. 59.

Figure 100:
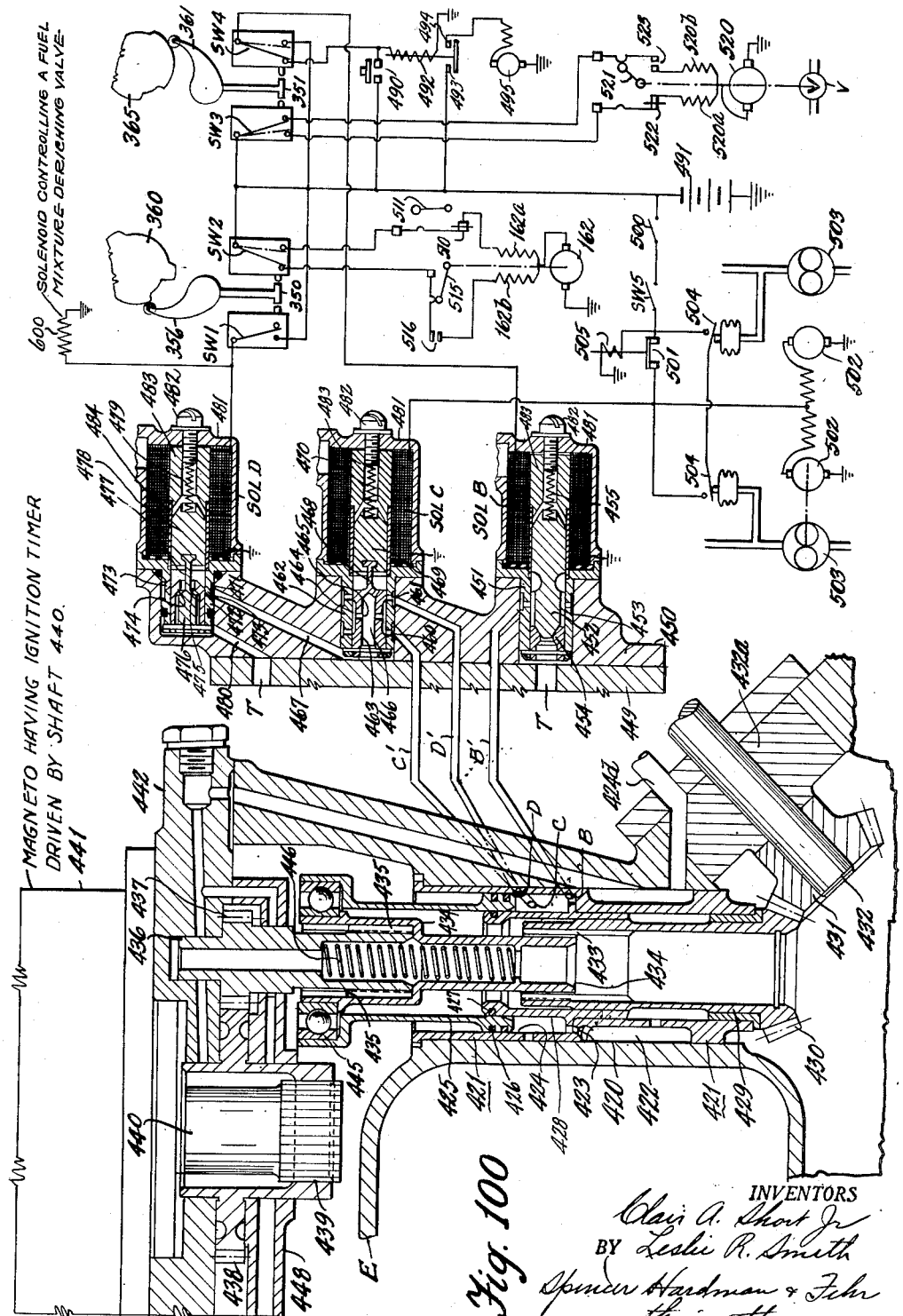
Figure 101:
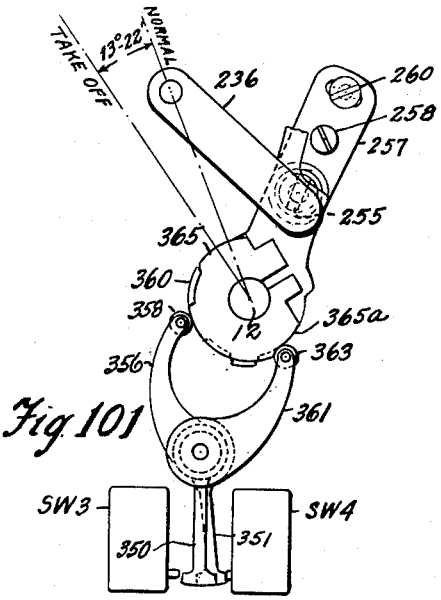

Figs. 61, 62 and 63 are sectional views taken respectively on lines 61—61, 62—62 and 63—63 of Fig. 60.

Fig. 64 is a plan view in the direction of arrow 64 of Fig. 12 of the speed servo piston 184.

Figs. 65 and 66 are views respectively in the direction of arrows 65 and 66 of Fig. 64.

Fig. 67 is a sectional view on line 67—67 of Fig. 64.

Fig. 68 is a sectional view on line 68—68 of Fig. 67.

Fig. 69 is a sectional view on line 69—69 of Fig. 68.

(Figs. 59 through 69 are drawn to a larger scale than Figs. 12 and 46 and are the same scale as Figs. 31 through 45.)

Figs. 70–87 are detail views of housing 10 and are drawn to a smaller scale than Fig. 6.

Fig. 70 is an end view of housing 10 as seen in Fig. 6.

Fig. 71 is a view in the direction of arrow 71 of Fig. 70.

Fig. 72 is a view in the direction of arrow 72 of Fig. 71.

Fig. 73 is a view in the direction of arrow 73 of Fig. 72.

Fig. 74 is a sectional view on line 74—74 of Fig. 71.

Fig. 75 is a sectional view on line 75—75 of Fig. 72.

Fig. 76 is a sectional view on line 76—76 of Fig. 71.

Fig. 77 is a sectional view on line 77—77 of Fig. 73.

Fig. 78 is a sectional view on line 78—78 of Fig. 71.

Fig. 79 is a view in the direction of arrow 79 of Fig. 71.

Fig. 80 is a sectional view on line 80—80 of Fig. 79.

Fig. 81 is a sectional view on line 81—81 of Fig. 73.

Fig. 82 is a sectional view on line 82—82 of Fig. 83.

Fig. 83 is a sectional view on line 83—83 of Fig. 71.

Fig. 84 is a sectional view on line 84—84 of Fig. 83.

Fig. 85 is a view in the direction of arrow 85 of Figs. 71 and 86.

Fig. 86 is a sectional view on line 86—86 of Fig. 71.

Fig. 87 is a sectional view on line 87—87 of Fig. 86.

Fig. 88 is a view of bracket 11 as seen in Fig. 12.

Fig. 89 is a view in the direction of arrow 89 of Fig. 88.

Fig. 90 is a view in the direction of arrow 90 of Fig. 89.

Figs. 91 and 91A (left extension of Fig. 91) show the controller as shown in Fig. 1 in association with other parts of the power plant.

Figs. 92, 92A and 93 form a view in the direction of arrow 92 of Fig. 91.

Fig. 94 is a view in the direction of arrow 94 of Fig. 93.

(Figs. 93 and 94 show a connection to the propeller pitch governor control lever.

Fig. 95 is a view in the direction of arrow 95 of Fig. 91.

Fig. 96 is a diagram showing control of the throttle valves and the hydraulic coupling scoop tube.

Fig. 97 is a diagram showing control of the datum or pressure selecting cam follower roller by temperature responsive means and by means responsive to the use of liquid injection.

Figs. 98 and 99 together constitute a diagram of connections between the speed lever of the controller and the feather motor and the propeller pitch governor control lever.

Fig. 100 is a diagram showing the control by electrical switches of the feather motor and of solenoids which control spark advance through the use of an hydraulic mechanism shown in longitudinal section.

Figs. 101–105 are diagrams showing the manner of controlling certain switches shown in Fig. 100.

Figure 106:
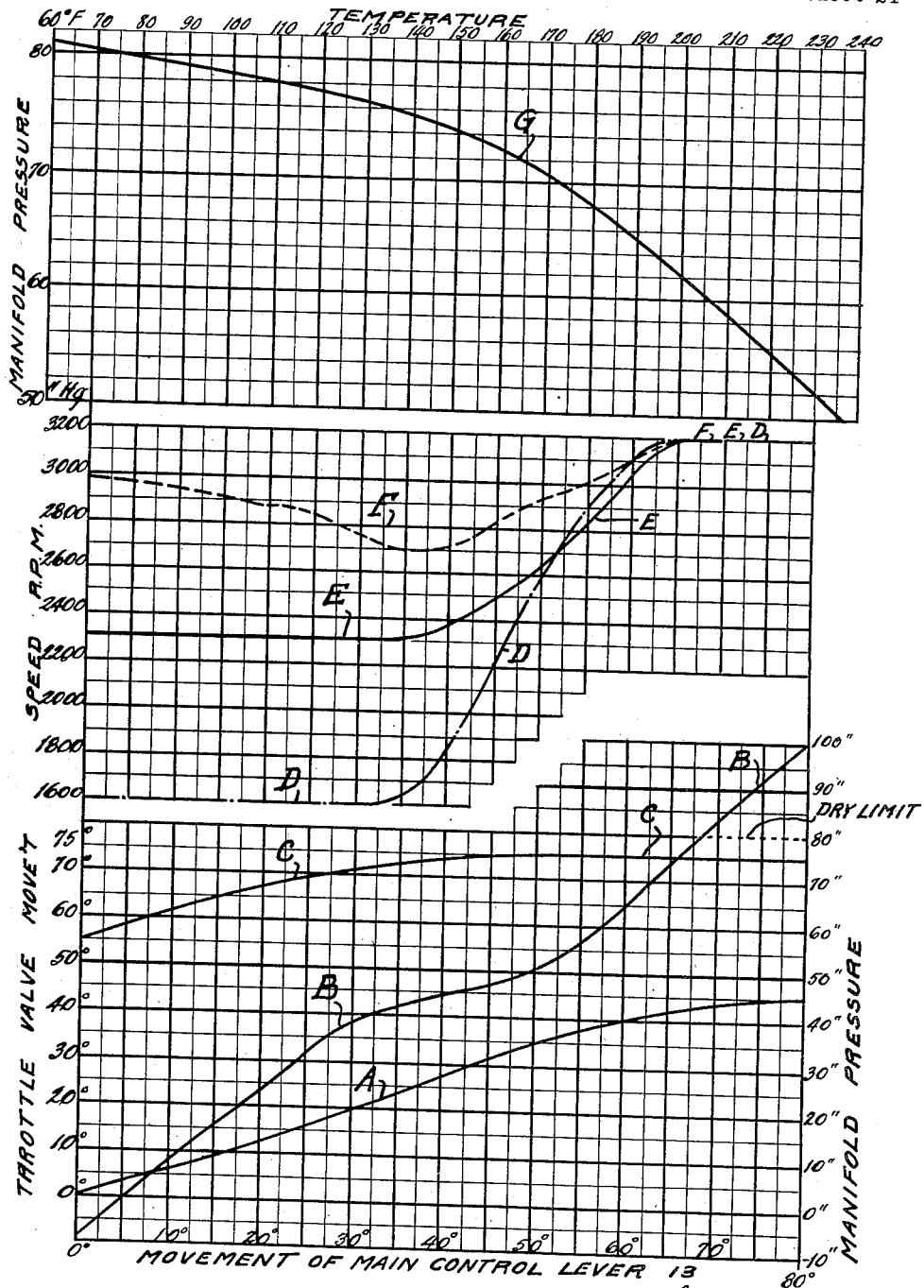

Fig. 106 is a chart showing the relation of throttle positions and pressure selections and speed selections to positions of the main control lever, and the relation of manifold pressures and fuel mixture temperatures at the detonation border line.

Figure 107:
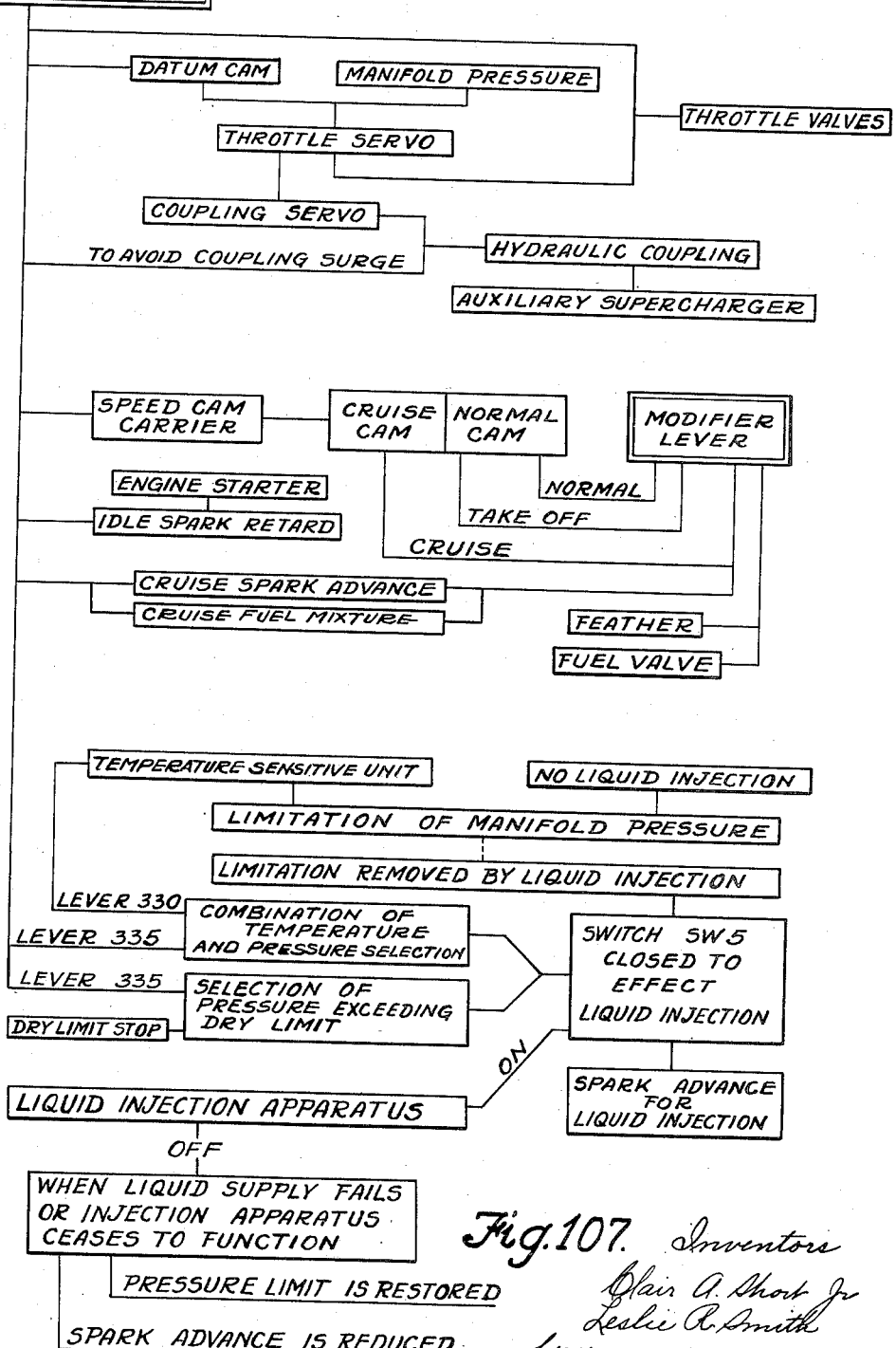

Fig. 107 is a chart of functions of the principal elements of the control.

Control of engine intake pressure

Referring chiefly to Figs. 7, 10, 11 and 24, a housing 10 and a bracket 11, secured to the interior of the housing, support a main control shaft 12 connected with a main control lever 13 operated by the pilot. Motion of shaft 12 is limited by stop screws 14a, 14b threaded into bracket 11 and engageable by a pressure selecting or datum cam 14 attached to shaft 12 and carrying a pivot stud 15 (Fig. 10) supporting a floating or differential lever 16 having a cam slot 17 which receives a roller 18 supported by a stud 19 attached to a lever 20 connected with a shaft 21 supported by bearings 22 and 23 supported by a cover 24 attached to the housing 10. Shaft 21 is connected with a lever 25 which is connected with the throttle valves of the engine. Cam 14 is engaged by a roller 30 (Fig. 10) pivotally supported by screw 31 attached to a lever 32 attached to a shaft 33 which, as shown in Fig. 15, is supported by a bearing 34 in recess 34a of bracket 11 and which is journaled in a lever hub 32a which is journaled in a hole 33a provided by the housing 10. A spring 35 (Fig. 10) attached to housing 10 and to the lever 32 urges the latter counterclockwise so that the roller 30 normally engages the cam 14. As shown in Fig. 7, lever 32 is connected by a link 36 with a floating lever 37 pivoted on a pin 38 fixed to a bridge 39 connecting bellows 40 and 41. Lever 37 is connected by a clevis 42 and flexible wire 43 with a valve 44 sliding in a valve guide sleeve 45 supported by housing 10. Sleeve 45 is surrounded by a spring 46 engaging a washer 47 engaging a split snap ring 48 attached to the sleeve. The function of the spring 46 is to urge the sleeve 45 to the right so that a flange 49 thereof engages a finished surface of the housing 10. A pressure oil source is connected through ducts 180, 181 (Fig. 74) of the housing with the sleeve-receiving bore 50 and through ports 51 of sleeve 45 with the space between the lands 52 and 53 of the valve 44. In equilibrium position of the valve 44, the lands 52 and 53 normally close ports 54 and 55 respectively. Ports 55 are connected by duct 55a (Fig. 84) with the right end of the cylinder 56 (Fig. 10). Fig. 7 shows a passage 57 and Fig. 72 shows a passage 57a which together connect port 54 with the left end of the cylinder 56 which is closed by a piston rod guide 58 retained by a cover 59 attached to the housing 10. Guide 58 together with a bushing 60 guide a piston rod 61 attached to a piston 62 slidable in the cylinder 56 and attached to a block 63 having a slot 64 which receives a pin 65, supported by the lever 16 and supporting a block 66 (Fig. 24) received between the bifurcations of the block 63. A spring 67 which is located between the guide 58 and the piston 62 urges these parts apart so that the guide 58 is normally located against a gasket 59' between the cover 59 and the housing 10 and the piston 62 is normally located at the right end of the cylinder 56.

Bellows 40 (Fig. 10) is attached to a left plate 70 having a shank 72 received by a bore 71 in cover 59. Springs 73 and 74 within the bellows 40 which is evacuated control the deflection of this bellows and also urge the stem 72 of the plate 70 against a tubular screw 75 which is threaded into the bore 71 and secured in the desired position of adjustment by lock nut 76. A screw 77 which retains a guard 78 also retains the stem 72 against the tubular screw 75. Bellows 40 has a right plate 80 which a bridge 39 connects with the left plate 81 of bellows 41 whose right plate 82 is attached to the housing 10 which provides a connection between the interior of the bellows and the engine intake manifold by ducts 83a (Fig. 82) and 83b and 83c (Fig. 86). The deflection of bellows 41 is under control by engine intake manifold pressure and by spring 84 which opposes contraction of the bellows 41 and by a spring 85 opposing expansion of this bellows. The spring 85 is located between a cupped washer 86, which a C-washer 87 connects with a stud 88 connected with plate 81, and the flange 89 of a sleeve 90 fixed to the plate 82. The bellows 40 and 41 have equal area exposed to environment pressures so that the bellows combination responds only to variations in intake manifold pressure. The springs within the bellows have calibrations such that the relation of the movement of pivot 38 to changes in manifold pressure is substantially a linear relation.

Referring to Fig. 106, the degrees of movement from 0° toward 80° represent counterclockwise movements of the main control shaft 12 as viewed in Figs. 1 and 10. The piston 62 being out or in the right position shown in Fig. 10, when shaft 12 is moved counterclockwise, a stud 15 moves counterclockwise about the axis of shaft 12 and through the lever 16 and follower 18 effects such counterclockwise movement of lever 20 that the engine throttles are moved from closed position through the angles represented by line A. Line B represents the pressures that are selected to be maintained by the controller for the various positions of the main control lever 13 connected with shaft 12. In order to obtain the selected manifold pressures according to line B, the throttle servo including piston 62 functions to effect additional opening movements of the throttle. Movement of the piston 62 left effects clockwise movement of the lever 20. As altitude increases, the throttle valves are opened wider in order to maintain the selected pressure. Line C represents the maximum opening movements of the throttle which are effected by movement of control lever 13 plus the movements which are effected by the servo. At 75° throttle position, the throttles are practically wide open. Therefore for selected pressures of 50″ Hg or greater, the throttles are wide open at critical altitude. For a pressure of 35″ Hg the throttle valves at critical altitude will be about 5° less than wide open.

Control of manifold pressure by liquid injection

Referring to Fig. 10, housing 10 provides a chamber 100 separated by a diaphragm 101 from a chamber 102 provided by a cap 103 attached to the housing 10. Chamber 100 connected through a pipe 104 (Fig. 8) with the cross-over conduit between the auxiliary and main superchargers. Since the air pressure in this conduit is that against which the injection liquid is forced by the liquid pump, the pressure in chamber 100 provides the same reference pressure below the diaphrgam opposing liquid pump pressure above the diaphragm. The chamber 102 is connected by a pipe 105 with the apparatus for injecting liquid such as W-A (water alcohol) mixture into the air along with the fuel at the inlet of the main supercharger. As disclosed in the patent to Trisler et al., granted December 20, 1949, No. 2,491,484, if the supply of liquid is exhausted or does not flow properly to the injection nozzle, there is no pressure in the chamber 102 to overcome the spring and cross-over conduit pressure 106 which urge the diaphragm 101 upwardly into the position shown in Fig. 10. Diaphragm 101 is confined between washers 107 and 108 which, together with the diaphragm, are retained by a screw 109 against the flange 110 of a rod 111 on which the nut 109 is threaded. Spring 106 urges the rod 111 upwardly until its upper end engages a pad 112 provided by a stop screw 113 threaded in cover 103 and locked into the desired position of adjustment by a nut 114. The rod extends through a seal 115 located in the bottom wall of the chamber 100 and it is connected by a stud 116 with a lever 117 pivotally supported by the shaft 33 (Fig. 15) but not connected therewith. As shown in Fig. 22, the lever 117 has segmental bosses 118 and 119 providing stops for the engagement of lugs 120 and 121 with which the lever 32 is provided. The function of lugs 118 and 119 is to limit movement of lever 32 from obtaining manifold pressures above a maximum limit set by screw 113 with the absence of fluid pressure in chamber 102 or remove limits of movement of lever 32 if fluid pressure in chamber 102 exists. As cam 14 (Fig. 10) moves counterclockwise to select higher manifold pressure, the roller 30 can follow this cam until the lugs 120 and 121 on lever 32 engage lugs 118 and 119 on lever 117 or until stop screw 332 engages lever 335 (Fig. 14) as will be explained in detail later. If no fluid pressure in chamber 102 exists sufficient to move diaphragm 101 down against the action of spring 106, the roller 30 cannot follow the cam 14 into position demanding certain high pressure selections. Therefore, although the main control lever 13 is moved into position demanding certain high pressure selections, those pressures are not actually obtained unless the injection liquid is present and flowing out the injection nozzle.

If however, fluid pressure in chamber 102 does exist, the diaphragm 101 moves down against the action of spring 106 and cross-over conduit pressure, thereby causing counterclockwise rotation of lever 117, as viewed in Figs. 10 and 22. This rotation of lever 117 not only allows lever 32 and roller 30 to contact cam 14 again but also overrides the stop screw 332 operating against lever 335 and stop arm 396 operating against roller 395 by stretching springs 323 and 400 respectively. It should be noted, however, that either or both of latter mentioned stops still maintain the switch SW5 in its closed position. If the flow of liquid through the injection nozzle should cease, the pressure in chamber 102 immediately falls and the spring 106 moves the diaphragm up and the lever clockwise, thereby causing clockwise movement of lever 32 and reduction in the manifold pressure actually obtained, although the main control lever may not have been moved into a position for selecting a pressure safe for engine operation without liquid injection.

Control of supercharger speed

Supercharging of the engine is effected by a main supercharger driven by the engine through a transmission having a fixed gear ratio and by an auxiliary supercharger (Figs. 91 and 92) driven by the engine through a variable speed ratio transmission such as an hydraulic coupling. Referring to Fig. 96, the coupling 130 is under control by a coupling scoop tube 131 connected by a link 132 with a bell crank lever 133 connected by link 134 with a piston rod 135 which, as shown in Fig. 28, slides through a bushing 136 attached to a cylinder 137 which is provided by the back cover 24 (Fig. 8). The cylinder 137 receives a piston 139 integral with the rod 135. A spring 140 urges the piston 139 downwardly, thereby placing the scoop tube 131 normally in a position for the lowest gear ratio of the hydraulic coupling. As the piston 62 closely approaches its extreme left position so as to open the throttle valves wide to obtain all of the pressure that is available from the main supercharger, a duct 141 (Figs. 71 and 74) is opened by the piston so that pressure fluid can pass through it and the restriction 142 (Fig. 9) into the cylinder 137 and below the piston 139 thereby raising it against the action of spring 140 to cause the coupling scoop to be moved into such position that the hydraulic coupling transmits motion at a higher gear ratio to the auxiliary supercharger so that its speed is increased in order to increase the supercharging action. If the supercharger action is more than necessary to maintain the selected pressure, the valve 44 is so moved automatically as to connect the right end of cylinder 56 with the drain and the left end with the pressure source. Therefore the piston 62 moves right to block the passage 141 and pressure fluid flow through ducts 57 and 143 into the cylinder 137 above the piston 139, thereby effecting a movement of the coupling scoop 131 to reduce the speed ratio of the hydraulic coupling. The restriction 142 effects stability of operation of the scoop. To avoid surge of the hydraulic coupling in the range of low-coupling ratios, the scoop tube 131 is moved slightly in the direction to increase coupling ratio by movement of lever 13 in the direction to increase manifold pressure selection. For this purpose, the pivot 133p of lever 133 is carried by a lever 144 pivoted at 144p on a plate 145. Lever 144 is connected with lever 13 in any suitable manner as by a link 146 (Fig. 96) which may be a Bowden wire 144w (Fig. 95) enclosed by a fixed tube 144t. As shown in Fig. 96, plate 145 can be adjustable by pivoting it at 145p and securing it in the desired position of adjustment by a clamp screw 147 extending through an arcuate slot 148 in plate 145 and threaded into a fixed part. As lever 13 is moved from lowest pressure selecting position 13a toward highest pressure selecting position 13b, lever 144 moves from 144a to 144b, lever 133 moves from 133a to 133b, link 132 moves from 132a to 132b and scoop tube end moves from 1s to 2s. This movement of the scoop tube increases the idling speed of the auxiliary supercharger slightly to take the coupling out of the surge range. This movement can take place while piston 139 is in lowest position. When piston 139 moves up to the position shown in Fig. 96, lever 133 moves to 133c, link 132 to 132c and coupling scoop tube end to 3s.

Coupling 130 connects engine driven shaft 600 (Figs. 95 and 96) with gear 601 meshing with gear 602 connected with the impeller 603 of auxiliary supercharger 604 whose outlet is connected by cross-over parts 605 and 606 (Figs. 91, 92) which the inlet duct of main or engine driven supercharger 607 whose outlet scroll is connected with the engine intake manifold and with bellows 41 of the controller (Fig. 10) by pipe 608 connected with duct 83c (Fig. 86). Part 605 receives throttle valves 610 and 611 (closed in Fig. 92) which rotate with shafts 612 and 613 respectively connected with levers 614 and 615 respectively which are connected by a link 616. Link 617 connects lever 615 with lever 25 (Fig. 24).

As shown in Figs. 6 and 8, the controller housing back cover 24 has integral brackets 24b by which the controller is supported by a pad 620 provided by the housing of supercharger 604 (Fig. 95). A strut 621 connecting the controller housing 10 with an extension 622 of the housing of supercharger 604 also supports the controller.

Control of engine speed

Referring to Fig. 94, circle 150 represents the hub of a propeller having pitch adjusting mechanism constructed for example in accordance with the disclosure of the application of Thomas B. Martin, Serial No. 520,627, filed February 1, 1944. The hub contains an hydraulic system for hydraulic blade pitch changing apparatus under control by a governor which is set by lever 151 located at the nose of the engine E. This lever can be set to effect governed speeds in an operating range and can be set to effect feathering of the blades. The propeller hub contains provisions for return of the blades from feathering condition to the operating range. Lever 151 is connected by link 152 with lever 153 attached to shaft 154 rotatably supported by bracket 155 and connected by a tube 156 rotatably supported by a bracket 157 (Fig. 92) connected by a coupling 158 with a rod 159 journaled in a bearing 160 supported by a bracket 161 fastened to the housing of supercharger 604. Bracket 161 supports an electric feather motor 162. Feather motor operated lever 163 (Fig. 98) is connected with a floating lever 164, one arm of which is connected by link 165 with a lever 166 attached to rod 159. The other arm of lever 164 is connected by link 167 with a lever 168 which appears also in Fig. 1. Lever 168 is attached to a shaft 170 (Fig. 12) rotatably supported by cover 59 and attached to a lever 171. Lever 171 is connected by a link 172 and pin 173 with a valve guide 174 which is shown in detail in Figs. 59 through 63. It has three sets of diametrically opposite longitudinally extending grooves marked 175, 176 and 177 which as shown in Figs. 61, 62 and 63 respectively are connected with the interior of the guide by ports 185, 186 and 187 respectively. The cover 59 as shown in Fig. 12, has a passage 178 which is connected by a pipe 179 (Fig. 8) with an oil pressure source. Passage 178 communicates with a passage 180 (Fig. 12) in housing 10 which through passage 181 connects with bore 50 (Fig. 7). Passage 180 is also connected by passage 182 with groove 183 of piston 184 which is attached to valve guide 174, by deforming flanges 184f (Figs. 65 and 69). Piston 184 provides passages 188 which are connected with valve guide grooves 176 and through ports 186 with the interior of guide 174. The distribution of pressure fluid from ports 186 to the ends of the cylinder 190 receiving the piston 184 is effected by a valve 191 having lands 192 and 193 respectively for controlling ports 185 and 187. If valve 192 is in position for connecting ports 186 and 187, grooves 177 of the guide will receive pressure fluid and it will flow thence through left ends of grooves 177 and notches 177n (Fig. 69) between flanges 184f to the left side of the piston 184 thereby causing it to move right against the action of a spring 195 until ports 185 and 187 are blocked by the lands 192 and 193 respectively of the valve 191. During this movement of the piston, oil at the right thereof flows through a port 196 thereof into grooves 175 and through ports 185 into the space within the guide 174 and through the hollow valve 191 and then to drain and then into the oil reservoir provided by the housing 10 which, as shown in Fig. 10, is connected with drain or the oil supply tank through a pipe 197. Similarly, when the valve 191 connects passages 185 and 186, pressure oil will flow into the groove 175 and thence through the passage 196 of piston 184 to the right side thereof to cause the piston to move left during which time oil at the left of the piston can move out through the grooves 177 and ports 187 to the interior of the guide 174 and to drain past notched flange 197 of valve 191 retained by a snap washer 198 received in a groove of the valve guide. This washer limits movement of the valve 191 to the right relative to the guide.

It is therefore apparent that the speed controlling servo motor includes a piston 184 which follows a control valve 191 so long as oil pressure is maintained. In case of pressure oil failure, spring 195 returns the piston 184 to left position to move the propeller pitch governor setting lever 151 to the position for high speed. This motion is assisted by a torsion spring 156a (Figs. 91A, 92A, 99) connected with a pin 156p attached to shaft 156 and with a bracket 156b attached to the engine frame. The lever 151 can be controlled by the pilot in a manner to be described by a suitable mechanism which overrides the speed controller servo. Return of piston 184 to left position picks up the valve 191 and locates it as shown in Fig. 12 so that the oil will not be trapped in cylinder 190 but can flow out through grooves 177, ports 187, space between lands 192 and 193, ports 186 and to passages 188 and to the oil inlet then not under pressure. Trapped oil would interfere with manually overriding the speed controlling servo.

Valve 191 is connected by a link 200 (Fig. 12) with a lever 201 which, as shown in Fig. 26, is connected to a sleeve 202 providing a hub which is journaled on a rod 203 which, as shown in Fig. 27, is eccentric to a shaft 204 which is rotatably supported by housing 10 and by bracket 11 (Fig. 26). The shaft 204 is provided with a screwdriver slotted head 205 to permit the insertion of a screwdriver by which the shaft can be turned in order to shift the position of the axis of part 203 and hence the axis of rotation of the lever 201. When the desired position of adjustment has been obtained the shaft 204 is retained by a clip 206 forced against the head 205 by a screw 207. A spring 210 which is coiled around the hub 202 has one end bearing against the bracket 11 and the other against the lever 201 thereby urging the lever counterclockwise as viewed in Fig. 12, in order to urge a follower roller 211 pivotally supported thereby toward a cruise control cam 212 or a normal control cam 213 selectively presented for engagement by the roller 211. The adjustment of the shaft 204 for the purpose of adjusting the location of the pivot of lever 201 is provided in order that, when either of cams 212, 213 call for highest speed, the servo piston 184 will just abut the member 190a which closes the left end of cylinder 190 and which, together with the cylinder 190, supports the valve guide 174.

Referring to Figs. 38 through 44, the cams 212 and 213 are pivotally supported by a rod 214 attached to a cam carrier 215 which is connected with the main control shaft 12 by a key 216 (Fig. 24). The cams 212 and 213 support as shown in Figs. 42 and 41 respectively, rollers 218 and 219 which springs 220 and 221 respectively urge against positioning levers 222 and 223 respectively, said levers being pivotally supported by a pin 224. As shown in Fig. 45, the levers 222 and 223 are engageable respectively with cruise sleeve 226 and normal sleeve 227 which are supported by the shaft 12 for longitudinal movement therealong while rotation thereof is restrained by virtue of splines 228 connecting the sleeves and a fixed pin 229 engaging a notch 230 provided by the sleeve 227. Sleeves 226 and 227 have helical camming surfaces 232 and 233 respectively engageable with helical camming surfaces 234 provided by the hub 235 of a lever 236.

As shown diagrammatically in Fig. 36 when the lever 236 is in cruise position (Fig. 91), its camming surfaces 234 will be located as shown so as to receive completely the camming surfaces 233 of sleeve 227 while receiving only a small portion of the surfaces 232 of sleeve 226. In such positions of the lever 236, the sleeve 226 (Figs. 24 and 45) will project to the left of sleeve 227 thereby causing movement of the lever 222 to the position shown in Fig. 44, thereby pushing the cruise cam 212 out, as shown in Fig. 42, for engagement by the roller 211 while permitting the normal cam 213 to move in, as shown in Fig. 41, so that the follower roller 211 will be under control by cruise cam 212 and not normal cam 213. Movement of lever 236 into take-off position, reverses these conditions so that surfaces 234 thereof receive only small portions of surfaces 233 while receiving plate portions of surfaces 232. Therefore the positions of sleeves 226 and 227 will be the reverse of that shown in Fig. 24, thereby retracting the cruise cam 212 from the control of and advancing the cam 213 in the position for controlling the speed selecting servo according to a schedule required for take-off and landing. When cam 213 is at 213′ for take-off (Fig. 41), cam 212 is at non-functioning position 212′.

Lever 236 has a normal position (Fig. 91) intermediate its cruise and take-off positions. In its normal position, lever 236 locates cam 213 at 213″ (Fig. 41) for the normal speed selecting schedule.

Referring to Fig. 45, a sleeve 240, located in a bore 240a of housing 10 and retained by a screw 241 threaded through the housing 10 and received by an annular groove 241b of the sleeve 240, supports the hub 235 of lever 236 which supports shaft 12 supported also by ball bearing 242 in a hole 242a provided by bracket 11. Lever hub 235 is retained within the sleeve 240 by half rings 243 and 244 received by an annular groove 245 of hub 235 and retained by the wall of the bore 240a. Seal rings 246 and 247 minimize escape of oil from the housing 10.

The lever 236 is movable between stops 250 and 251 which are attached to the housing cover 252 (Figs. 1 and 6). For the take-off position of lever 236, stop 250 is engaged by the upper end of a screw 253 threadedly connected with lever 236; and the head of said screw engages stop 251 for the feather position of lever 236. The position of lever 236 relative to the stop can be adjusted by turning the screw 253 which can be locked in the desired position of adjustment by nut 254. The cruise schedule effected by lever 236 when in cruise position (Fig. 91) is represented by dot-dash line D of Fig. 106. Full line E represents the normal schedule effected by location of lever 236 in the normal position (Fig. 91). The dash line F represents the take-off schedule effected by location of lever 236 in take-off position (Fig. 91). When using take-off schedule and at low manifold pressure, the engine speed will be a function of engine power rather than as shown by line F. All the schedules merge into a horizontal line at 3200 R. P. M. This speed is determined by surface 215a of cam carrier 215 engaged by roller 211 as shown in Fig. 13, showing carrier 215 in position for maximum speed. The location of lever 236 in cruise position is determined by detent on the sector of the pilot's lever which operates the lever 236. The normal position of lever 236 is determined by the engagement of a groove 255 (Fig. 4) of lever 236 with a spring pressed plunger or detent 256 which is carried by an adjustable lever 257 pivoted on a screw 258 threaded into the housing 10 and provided with a slot 259 for receiving a screw 260 threaded into the housing. Lever 257 supports a thimble 261 (Fig. 5) threadedly engaging a bushing 262 secured by a lock nut 263. The bushing 262 guides the detent 256 which is urged outwardly by a spring 264 until a flange 265 of detent 256 engages the inner end of bushing 262. The longitudinal location of detent 256 is determined by the location of bushing 262 relative to the lever 257. The location of detent 256 relative to the lever 236 is determined by angular position of plate 257 which can be adjusted after loosening the screw 260 and then tightening the screw 260 to clamp the lever 257 to the housing 10 into the desired position of adjustment.

Temperature sensitive unit

Curve G (Fig. 106) shows the values of temperature which at the corresponding values of manifold pressure above which cause detonation will occur in a certain type of engine.

Referring to Fig. 92, the housing of supercharger 604 provides a pad 270 to which there is secured a housing 271, which is shown in detail in Fig. 46. Screws 272 (Fig. 49) secure to the housing 271 a plate 273 to which one end of a metal tube 274 is attached. A nut 275 is attached to the other end of tube 274 for receiving the threaded portion 276 of a metal rod 277 having a coefficient of expansion substantially less than that of tube 274. Rod 277 may be made of Invar metal having practically zero coefficient of expansion and tube 274 may be made of aluminum. Tube 274 and rod 277 extend within the outlet scroll of the supercharger 604 (Fig. 92). Tube 274 has holes 278 so that air can circulate into the tube and around the rod. As the temperature of the air varies there is relative movement between the rod and the tube. As the tube increases in length with temperature increase, there is movement of the right end of the rod 277 toward the left in Fig. 46.

Rod 277 has flats 279 which are received by a notch 280 of a lever 281 having a hole 282 (see also Fig. 57) for receiving a pin 283 which is integral with a screw 284 but slightly eccentric relative thereto, as shown in Fig. 51. By turning the screw 284, which is threaded through the housing 271, the position of pin 283 can be adjusted and the screw is locked in the desired position of adjustment by a lock nut 285. Rod 277 passes through a seal 286. The upper end of lever 281 is also provided with a notch 287 between ears 288. Notches 280 and 287 have bottom surfaces 280a and 287a respectively which are arcuate with respect to gauge locating holes 280h and 287h respectively. Notch surface 280a is engaged by the right end of rod 277. Notch surface 287a is engaged by the right end of valve 289 having flats received between the ears 288 of notch 287. Notch ears 288 support a pin 290 passing through a slot 290a of valve 289. Valve 289 is received by a valve guide 291 attached to a piston 292 received by a cylinder 293 provided by the housing 271. Pad 270 has a pressure oil duct and an oil drain duct connected respectively with ducts 294p and 294d provided by plate 273 and housing 271. Duct 294p is connected with groove 295 of the piston 292. The right end of cylinder 293 is closed by the housing 271 and the valve guide 291. The left end of cylinder 293 is closed by a cover 296. The construction of piston 292 and valve guide 291 is similar to the construction of the corresponding parts of the speed controlling servo. Therefore it will be understood that the piston 292 follows the valve 289 whose position is determined by the location of the right end of rod 277 against which the lever 281 is urged by a spring 297 confined between the valve guide and a snap ring 298. Motion of the piston 292 is transmitted by a pin 300 to a lever 301 attached to a shaft 302 which is rotatably supported by the cover 296.

Shaft 302 is connected, as shown in Fig. 92, with a lever 303 which is connected by a link 304 with a lever 306 which, as shown in Fig. 12, is connected with a shaft 307 which is rotatably supported within a hole 303a of a wall 308 of housing 10 and by a cover 309 supporting a shaft seal 310. Motion is transmitted from shaft 307 by a bevel gear 311 integral with the shaft and meshing with a bevel gear 312 supported by a shaft 313 and connected with a cam 314. Shaft 313 is journaled in a hole 313a of housing 10 (Fig. 71) and within a hole 313b of bracket 11 (Fig. 90). Cam 314 is engageable with a follower roller 315 (Fig. 25) attached to a lever 316, attached to a hub 317 rotatably supported by a rod 318 which is journaled in a hole 318a of housing 10 (Fig. 71) and in a hole 318b of bracket 11 (Fig. 90). Lever 316 is connected by a link 319 (Fig. 12) with a lever 320 integral with a hub 321 and having an arm 322 connected by a spring 323 with a clip 324 attached to the housing 10. The function of spring 323 is to maintain roller 315 in engagement with cam 314 as it is moved by the temperature servo piston 292. As temperature of tube 274 increases, the piston 292 moves right and effects counterclockwise rotation of shaft 307 as viewed in the direction of arrow 307a (Fig. 12) and cam 314 rotates counterclockwise toward the position shown in Fig. 12 from the position shown in Fig. 97. Spring 325 loads the bevel gears 311 and 312 to eliminate back lash.

The lever hub 321 to which arm 320 is attached is attached to the hub 329 of lever 330 which supports shaft 33. Lever 330 (Figs. 14, 20, 21) has a lug 331 carrying an adjustable stop screw 332 fixed by a nut 333. The screw 332 is engageable with a lever 335 attached to shaft 33 to which datum cam follower lever 32 is attached. As manifold pressure selection increases, lever 335 moves counterclockwise (Figs. 14, 19). As air temperature increases, lever 320 moves clockwise. Since cam 314 follows schedule G (Fig. 106), when the temperature is such that detonation would occur during engine operation at the selected manifold pressure, the pressure actually obtained is limited to a value less than that which would cause detonation at that temperature by virtue of the engagement of stop screw 332 with lever 335 so that the follower roller 30 is held away from the datum cam 14. Slightly ahead of the engagement of stop screw 332 with lever 335, the lug 331 of lever 330 engages roller 395 and causes a switch SW5 to be closed to cause the liquid injection apparatus to start in a manner to be described. Then the diaphragm 101 (Fig. 10) moves down and the temperature limiting control of manifold pressure is overridden because, with liquid injection, it is safe to operate the engine at high pressure selection with relatively high temperature of air flowing from the auxiliary supercharger.

A switch SW5 (Fig. 14) is secured to a plate 380 having a hole 381 which receives the end of shaft 33 (Fig. 15) whereby the plate 380 can be adjusted angularly relative to shaft 33. Plate 380 is adjusted relative to plate 335 by a disc 382 having a screwdriver slotted head eccentric to a shank 383 of disc 382 pivotally supported by the plate 335. Disc 382 is received by a notch 284 in plate 380. By turning the slotted disc 382, the angular position of plate 380 relative to plate 335 can be adjusted; and, when once adjusted, plate 380 is fixed to plate 335 by screw 386 passing through an arcuate slot 387 in plate 380 and received by a screw threaded hole 388 in plate 335. Switch SW5 has an operating plunger S5 adapted to be engaged by a spring blade 390 provided by bracket 391 attached to a plate 380 by screws 392 which also secure the switch SW5 to plate 380, said screws engaging threaded holes 392 in plate 380. Blade 390 supports the roller 395 adapted to engage the lever lug 331 and also a lever 396 attached to a hub 397 attached to a lever 398, said hub being supported by a rod 399. A spring 400 which connects lever 396 with the housing 10 urges both levers 396 and 398 counterclockwise so that lever 398 engages a stop screw 401 threaded through the housing 10 and secured in the desired position of adjustment by a lock nut 402. Lever 396 provides a dry-limit stop which, when engaged by roller 395, causes switch SW5 to close when selected manifold pressure is close to a value which, if permitted to exist in the intake manifold, would result in detonation although the air temperature might be too low to be a detonation factor. Therefore the liquid injection apparatus is caused to function to permit safe operation of the engine with manifold pressure higher than those which are permissible without liquid injection. When the liquid injection apparatus functions, diaphragm 101 (Fig. 10) moves down and the cam 30 is caused to engage cam 14 and the dry-limit stop lever 390 is overridden and spring 400 is stretched. Also the temperature lever 330 is overridden and spring 323 is stretched.

The housing 10 (Figs. 24, 14) provides a chamber 252a closed by cover 252 and containing switches SW1 and SW2 under control by lever 350 and switches SW3 and SW4 under control by lever 351. Levers 350 and 351 are attached respectively to hubs 352 and 353, the latter being attached to a shaft 354 (Fig. 24) rotatably supported by the hub 352 which is journaled in a bushing 355 supported by the cover 252. Lever 350 is connected through the hub 352 with a lever 356 carrying roller 358 for engaging a cam 360 having surfaces 360a, 360b, 360c and 360d provided by lever 236 (Fig. 3). Lever 351 is connected through shaft 354 with a lever 361 (Fig. 1) carrying a roller 363 for engaging surfaces 365a, 365b and 365c of a cam 365 (Fig. 2) which can be secured to the main control shaft 12 in the desired position, said cam having internal splines 367 adapted to engage corresponding splines on the shaft and having a split hub adapted to be clamped by a set screw (not shown) passing through hole 369 and threaded in the hole 371. The switches SW1–SW4 are supported by the cover 252 in such manner that the switches can be adjusted relative to their respective operating levers 350, 351. For this purpose, the switches are pivotally supported in pairs by screws 372 (Fig. 1) passing through central holes in washer 372a supported by the cover 252 and threaded in the cases of the switches and also by screws 373 passing eccentrically through disc 374 supported by the cover 252. When the screws 373 are loosened, the discs 324 can be rotated thereby shifting the switches angularly relative to the pivot screw 372, thereby changing the clearance between the switch operating plungers and the levers 350 and 351.

*Spark advance control*

Referring to Fig. 100, a portion of frame E of the engine provides a cylindrical bore 420 which receives a sleeve 421 having an annular groove 422 which, together with the side wall of the bore 420, provides a chamber for receiving pressure oil which enters through a duct 424d and flows through an orifice 423 into a cylinder 424 which the upper portion of the sleeve 421 provides. The cylinder 424 receives a tubular piston 425 having piston rings 426 engaging the cylinder 424. The inner surface of the piston 425 is engaged by a ring 427 supported by a sleeve 428 attached to the sleeve 421. The sleeve 421 and the sleeve 428 rotatably support shaft 429 having a bevel gear 430 meshing with a bevel gear 431 connected with an engine driven shaft 432 journaled in a block 432a through which duct 424d extends. Shaft 429 is connected by helical splines 433 with a shaft 434 which is connected by helical splines 435 with a shaft 436 having a gear 437 meshing with a gear 438 having longitudinal splines 439 adapted to receive the splines of a shaft 440 which drives the magneto whose housing 441 is supported by a plate 442 attached to the engine frame E. The piston 425 is connected through a ball bearing 445 with the shaft 434; consequently, movements of the piston 425 effect angular displacement of shaft 434 relative to shaft 429 and angular displacement of shaft 436 relative to shaft 434.

Upward movement of piston 425 which is opposed by spring 446 effects spark advance and downward movement effects spark retard. As shown, the piston 425 is in a position of spark advance slightly less than maximum. As stated before oil under pressure enters the cylinder 424 through port 423 and can escape through one of three ports B, C and D depending upon which port is open. If port B is open piston 425 will be held at its lowest position for maximum retard by the spring 446. If port B is closed and port C is open the piston 425 will rise until it uncovers port C and normal ignition timing will be obtained. If ports B and C are closed and port D is open, the timing will be set at maximum advance when liquid injection is used. If none of the three ports B, C and D are open, the piston 425 rises until its upward limit of travel is reached when piston 425 engages the underside of a plate 448 attached to plate 442. This position corresponds to "cruise" advance. The ducts B', C' and D' connected respectively with the ports B, C and D, lead through a mounting pad 449 on the engine frame and thence through the base 450 of a solenoid valve assembly which is secured to the mounting pad.

Duct B' connects with a valve guide 451 receiving a valve 452 having longitudinal grooves 453 and engageable with a seat 454 through the action of a spring 455. When solenoid SOL B is energized, valve 452 moves right from its seat and port B is connected with drain T.

Passages C' and D' are connected respectively with ports 460 and 461 of a valve guide 462 which receives a valve 463 having an annular groove 464 connected by holes 465 with a central bore 466 communicating with a passage 467. Valve 463 has a stem 468 connected with a solenoid armature 469 urged left by spring 470, so that the valve 463 is normally in the position shown. When solenoid SOL C is energized, valve 469 moves right causing duct C' to be blocked and duct D' to be opened and connected with passage 467.

Passage 467 is connected with an annular groove 471 of a sleeve 472 having holes 473 connecting the groove 471 with the interior of the sleeve which provides a valve seat 474 having a central port 475 which a valve 476 is adapted to close when moved right from the normal open position shown. Valve 476 has a stem 477 connected with a solenoid armature 478. A spring 479 biases the valve 470 into open position and when opened the passage 467 is connected with a passage 480 connected with drain T. When solenoid SOL D is energized valve 476 closes port 475. The solenoids are constructed practically alike each has a shell 481 to which a screw 482 attaches a core 483 surrounded by the solenoid winding 484 which also surrounds a non-magnetizable sleeve 484 providing a guide for the solenoid armature. In the case of SOL B, the armature is integral with the valve 452.

When the pilot closes the starter switch 490 to connect battery 491 with starter relay 492, the relay closes its contacts 493, 494 which connects the starting motor 495 directed with the battery. Concurrently the battery 491 is connected through switch SW4 normally in full-line position (Fig. 100) with solenoid SOL B so that passage B' is connected with drain. Therefore maximum spark retard is obtained during engine starting although the pilot may not have moved the throttle valves to idling position. When the pilot moves lever 13 to place the throttle valves in idling position (Fig. 101), cam 365 is so located that a spring S (Fig. 24) urges lever 351 counterclockwise to cause switch SW4 to be moved to dot-dash line position (Fig. 100) and solenoid SOL B is energized. Therefore, either in starting the engine or in idling the engine, the solenoid SOL B is energized to open the valve seat 452 so that port B is connected with drain and the piston 425 remains in lowest position to give minimum spark advance.

Figure 102:
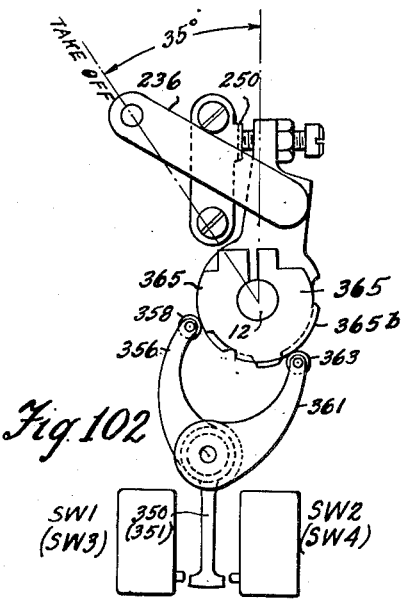

When the pilot moves the throttle valve by lever 13 into the normal operating range of the engine, cam 365 will be in a position such as shown in Fig. 102 and switch SW4 returns to full-line position (Fig. 100) and solenoid SOL B is not energized. The solenoids SOL C and SOL D are not energized whether lever 236 be in normal or take-off position. Therefore a passage D' is blocked and passage C' is connected with drain while passage B' is blocked. Therefore ignition will be advanced by upward movement of the piston 425 until it uncovers port C which is connected with drain through valve 463, passage 467 and the normally open port 475 of valve seat 474. The normal spark advance is effective for take-off or normal operation.

Whenever switch SW5 is closed in the manner described to cause the alcohol-water pump to start, solenoid SOL C is actuated and valve 463 moves right to block duct C' and to connect duct D' through passage 467 with drain. Therefore, the piston 425 will rise until port D is uncovered which effects spark advance permissible with liquid injection. If the pilot moves the lever 236 to "cruise" position (Fig. 103) and cam 365 into the cruise range corresponding to selection of manifold pressure in the cruise range, switch SW1 is closed to cause solenoid SOL D to be energized and valve 476 to close port 475. Therefore ports B, C and D are all closed and piston 425 rises to its upward limit of travel.

Figures 103, 104, 105:
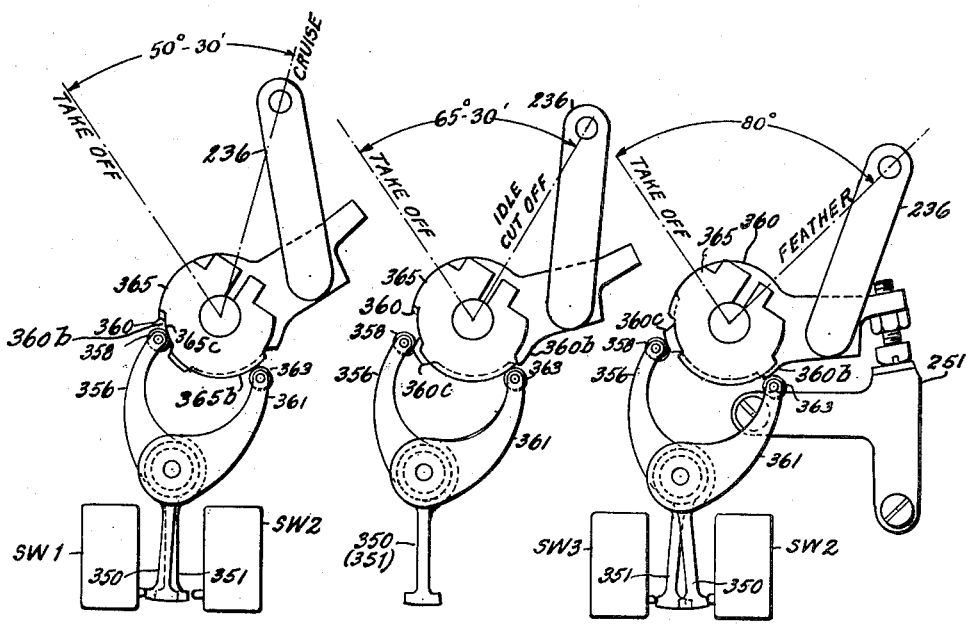

The selection of a manifold pressure higher than the cruise range, is accompanied by a counterclockwise movement of cam 365 from the position shown in Fig. 103 and lever 356 moves left and lever 350 moves right and switch SW1 opens. Then the electrical circuit of SOL D will be broken so that the valve 476 will open, allowing oil to flow through port C to drain and the ignition timing returns to normal advance. The ignition timing positions of piston 425 are, for example, approximately as follows:

Retard for cranking or idling. 17°–20° before top dead center.
Normal engine operation. 31°–34° before top dead center.
Liquid ignition operation. 34°–47° before top dead center.
Cruise advance. 42°–45° before top dead center.

The switch SW5 (Fig. 100) is in series with a pilot's manually operated switch 500 and a time delay relay switch 501. When these switches are closed, battery 491 is connected with injection liquid pressure pump motors 502 driving pressure pumps 503 for a two-engine installation. After a few seconds which should be long enough for the pumps to develop full pressure of injection liquid and to effect closure of two pressure controlled switches 504 in series and by-passing switch 501, coil 505 becomes sufficiently energized to open switch 501. Thereafter coil 505 holds switch 501 open so long as both switches SW5 or 500 are closed. The circuit to solenoid SOL C is then through switches 500, SW5, and both switches 504. If the supply of injection liquid for one of the engines should become exhausted or the injection apparatus of either engine should fail, a switch 504 opens and solenoid SOL C is deenergized and the ignition timing returns to normal advance.

Control for feathering

As disclosed in the Martin application referred to, movement of the propeller pitch governor setting lever beyond the position for maximum blade angle for flight operation to a feather position causes the blades to be feathered in case operation of the engine should be discontinued. In case of a multi-engine airplane, flight may be continued with one of the engines disabled. If the trouble with the disabled engine is remedied during flight, it can be started again in consequence of movement of the governor setting lever to a position in the flight range whereupon blade angle returns to a value such that the engine will be started by windmilling the propeller. The Martin application discloses an hydraulic pressure fluid reserve which is made available to turn the blades from feathering position to an angle in the flight range when the governer setting lever is moved from feathering position to a flight range position.

Referring to Fig. 94, if the propeller governor setting lever 151 is moved from high blade angle, low speed position 151a to feathered position 151b, feathering takes place and conversely movement from 151b to 151a results in unfeathering and windmilling the engine to effect starting in case an engine starter is not available.

When feathering is desired, the pilot moves lever 236 to feather position (Fig. 104) which effects movement of switch SW2 to dot-dash line position (Fig. 100). Feather motor 162 (Fig. 98) rotates lever 164 clockwise and shaft 159 clockwise and lever 151 clockwise (Fig. 94). When lever 151 arrives at feather position, limit switch 510 (Figs. 100 and 99) is opened by a lever 511 carrying an adjustable stop screw 512 which engages the plunger 513 of switch 510. Then motor 162 stops because its feather field winding 162a is open circuited. Concurrently as shown in Fig. 104, lever 126 effects movement of switch SW3 (Fig. 100) to dot-dash position to cause motor 520 to turn in the direction to close fuel valve V and to cause all fuel between valve V and the engine to drain back to a supply tank. When valve V has been closed, an arm 521 has been rotated counterclockwise to open a limit switch 522 in the circuit of valve-closing motor field 520a. Movement of lever 236 to idle cut-off position in Fig. 105 results in return of switches SW2 and SW3 to normal or full-line positions in Fig. 100 so that motors 162 and 520 operate in the reverse direction. Motor reverse field 162b is effective because, during feathering, an arm 515 operated by motor 162 had turned counterclockwise to permit closing of limit switch 516 in the circuit of field 162b. During unfeathering operation of the motor 162, arm 515 rotates clockwise to open limit switch 516 when movement of governor setting lever 151 to position 151a is completed. Similarly, during the closing of valve V by motor 520, arm 521 had rotated counterclockwise to permit closing of limit switch 523 in the circuit of valve opening field winding 520b of motor 520. Therefore when switch SW3 returns to full-line position, field 520b is effective to cause operation of motor 520 to open valve V and shut off fuel drains between the valve V and the engine. When valve V is fully open, arm 521 has by clockwise rotation opened limit switch 523.

Wires connected with the terminals of switches SW1–SW5 are connected with junction terminals of connector 410 which screws 411 attach to cover 252.

Cover 252 supports a dial plate 420 having manifold pressure graduations 421 which are indicated by a pointer 422 which screws threaded through holes 424 in cam 365 attach to said cam and hence to shaft 12.

Summary

Referring to the function chart (Fig. 107), main control lever 13 can move the throttle valves to a position to obtain up to 48" Hg manifold pressure which is sufficient for landing in event of failure of the throttle servo. The throttle valves are positioned jointly by the main control lever 13 and by the throttle servo which is under control by the datum cam 14 moved by lever 13 and by a follow-up under control by manifold pressure bellows 41 which stops the throttle servo when manifold pressure equals the selected pressure or the limitations which are placed on obtainable pressure mentioned hereinafter.

The throttle valves are moved to full-open position by the joint operation of the main control lever and the throttle servo as altitude increases and for all values of selected pressure except in the lower cruise range where throttle opening is not more than 5° less than wide open. Before critical altitude is reached for a selected manifold pressure obtainable chiefly by the main supercharger, the speed of the auxiliary supercharger is substantially increased by a movement of the hydraulic coupling scoop tube toward the axis of the coupling, said movement being effected by a scoop tube servo rendered effective by a movement of the piston of the throttle servo to a position such that the throttle valves are nearly wide open.

The scoop tube of the hydraulic coupling is controlled also by the lever 13 which decreases coupling slip sufficiently to avoid coupling surge while the coupling operates in the low speed ratio range.

Lever 13 rotates the speed selecting cams which are mounted on a carrier connected with shaft 12, thereby maintaining a scheduled relation between manifold pressure selection and speed selection.

Lever 13 controls spark-timing for idling and for take-off and normal operation and operates jointly with modifier lever 236 to effect spark-timing for cruise operation which requires location of lever 13 for manifold pressure in the cruise range and requires location of lever 236 to select the cruise speed selecting cam.

Modifier lever 236 selects the take-off speed schedule or the normal speed schedule or the cruise speed schedule. It effects cruise spark-advance when selecting cruise speed schedule provided lever 13 has selected a manifold pressure in the cruise range. If the pressure selected is changed to a value higher than the cruise range, spark-advance returns to normal.

Modifier lever 236 controls feathering and fuel valve shut-off and unfeathering and fuel valve opening.

Detonation is prevented by limiting obtainable pressure to a value below that at which detonation would occur if the engine operated while a particular air-for-fuel-mixture temperature existed, no liquid injection being used.

Detonation is prevented by limiting obtainable manifold pressure to a value below that at which detonation would occur if the engine operated without liquid injection although the air-for-fuel-mixture temperature were too low to be a detonation factor.

When the pilot desires it, liquid injection is effected in response to that combination of existing manifold pressure and air-temperature close to the detonation-border-line schedule of pressure and temperature for engine operation without liquid injection and in response to the selection of a pressure which, if obtained, would cause detonation during engine operation without liquid injection although air temperature is too low to be a detonation factor. When liquid injection is effective, spark-advance suitable for operation of the engine with liquid injection is effected.

When the supply of injection liquid is exhausted or when the injection apparatus fails to function, the limitations on obtainable manifold pressure effected by a combination of temperature and pressure close to detonation-border-line schedule, or by pressure alone when temperature is too low to be a detonation factor, are restored, and spark-advance returns to normal.

When the present apparatus is used with an engine having a fuel system provided with an electrically controlled fuel mixture selector, the switch SW1 (Fig. 100) which is closed by modifier lever 236 in cruise position (Fig. 103) to effect cruise spark advance, a solenoid 600 (Fig. 100) is energized to operate a derichment valve which causes the fuel mixture to be rendered more lean when cruising. Some fuel systems provide for energization of solenoid 600 when water-alcohol injection is in operation.

The feathering motor 162 (Fig. 98) can be independently controlled by the pilot for emergency R. P. M. control by a switch (not shown) located in the cockpit. If the R. P. M. servo fails, its piston is spring returned to a position calling for maximum R. P. M. The feather motor then can be controlled by the pilot for operation in the feathering direction to obtain the blade angle required for lower R. P. M.; and the motor can be controlled by the pilot for operation in the opposite direction to return the motor to normal status.

While the embodiment of the present invention as herein disclosed, constitutes a preferred form, it is to be understood that other forms might be adopted.

What is claimed is as follows:

1. Apparatus for controlling an aircraft engine having a throttle valve movable to different positions to control the supply of combustible mixture to said engine and the engine intake pressure, and operating a propeller having a pitch governor for maintaining a selected speed and a governor control member movable to different positions to select the speed to be maintained, said apparatus comprising a main control lever, an engine intake pressure selecting device actuated thereby, an element sensitive to engine intake pressure, a mechanism under control by the device and element for positioning the engine throttle valve to obtain the selected pressure, a speed cam carrier moved by said lever, two cams moving with the carrier, a cam follower engageable with the cams, a speed servo under control by the cam follower and means connecting said servo with the governor control member, a speed-schedule selecting lever, and a mechanism operated by the speed lever for selecting the cams for control of the cam follower and for variably positioning one of the cams whereby it will provide a plurality of speed schedules relative to pressure selection.

2. Apparatus for controlling an aircraft engine having a throttle valve movable to different positions to control the supply of combustible mixture to said engine and the engine intake pressure, and operating a propeller having a pitch governor for maintaining a selected speed and a governor control member movable to different positions to select the speed to be maintained, said apparatus comprising a main control lever, an engine intake pressure selecting device actuated thereby, an element sensitive to engine intake pressure, a mechanism under control by the device and element for positioning the engine throttle valve to obtain the selected pressure, a speed cam carrier moved by said lever, two cams moving with the carrier, a cam follower engageable with the cams, a speed servo under control by the cam follower and means connecting said servo with the governor control member, a speed-schedule selecting lever having three positions in succession and a mechanism operated by the speed lever for placing one of the cams in a speed scheduling position for control of the cam follower in accordance with the first position of the speed lever and for placing said cam in another speed scheduling position in accordance with the second position of the speed lever while placing the other cam in a position out of the range of the position of the first cam, and for placing the other cam in a speed scheduling position for control of the cam follower in accordance with a third position of the speed lever while placing the first cam in a non-controlling position.

3. Apparatus for controlling an aircraft engine having a throttle valve movable to different positions to control the supply of combustible mixture to said engine and the engine intake pressure, and operating a propeller having a pitch governor for maintaining a selected speed and a governor control member movable to different positions to select the speed to be maintained, said apparatus comprising a main control lever, an engine intake pressure selecting device actuated thereby, an element sensitive to engine intake pressure, a mechanism under control by the device and element for positioning the engine throttle valve to obtain the selected pressure, a speed cam carrier rotated by said lever, two cams pivotally supported by the carrier and movable to a speed scheduling position, means operable to actuate said cams, a cam follower engageable with the cams, a speed servo under control by the cam follower and means connecting said servo with the governor control members, two members mounted for movement toward and away from the carrier and each presenting a surface normal to the carrier axis, two motion transmitting parts supported by the carrier and respectively operatively connected with the cams and urged by the spring means into engagement respectively with the normal surfaces of the members, a speed schedule selecting lever and means operated thereby for moving the members in opposite directions.

4. Apparatus for controlling an aircraft engine having a throttle valve movable to different positions to control the supply of combustible mixture to said engine and the engine intake pressure, and operating a propeller having a pitch governor for maintaining a selected speed and a governor control member movable to different positions to select the speed to be maintained, said apparatus comprising a main control lever, an engine intake pressure selecting device actuated thereby, an element sensitive to engine intake pressure, a mechanism under control by the device and element for positioning the engine throttle valve to obtain the selected pressure, a speed cam carrier rotated by said lever, two cams pivotally supported by the carrier and movable to a speed scheduling position, means operable to actuate said cams, a cam follower engageable with the cams, a speed-servo under control by the cam follower and means connecting said servo with the governor control members, two concentric sleeves supported for movement axially of the carrier and each presenting at the end thereof adjacent the carrier a surface normal to the carrier axis and at the end remote from the carrier a helical cam surface, two motion transmitting parts supported by the carrier and respectively operatively connected with the cams and urged by the spring means into engagement respectively with the normal surface of said sleeves, a speed-schedule selecting lever rotatable coaxially of the carrier, a cam rotated by said lever and having a helical cam surface for engaging the helical cam surfaces of the sleeves, means for so connecting the sleeves that their helical cams are angularly displaced while providing for relative axial movement thereof, and means for preventing rotation of the outer sleeve while permitting coaxial movement thereof during rotation of the cam whereby the sleeves are moved in opposite directions during movement of the speed lever.

5. Apparatus for controlling an aircraft engine having a throttle valve movable to different positions to control the supply of combustible mixture to said engine and the engine intake pressure, and operating a propeller having a pitch governor for maintaining a selected speed and a governor control member movable to different positions to select the speed to be maintained, said apparatus comprising a main control lever, a shaft supporting said lever, an engine intake pressure selecting device actuated thereby, an element sensitive to engine intake pressure, a mechanism under control by the device and element for positioning the engine throttle valve to obtain the selected pressure, a speed cam carrier supported by the shaft and connected thereto, two cams pivotally supported by the carrier and movable to a speed scheduling position, means operable to actuate said cams, a cam follower engageable with the cams, a speed-servo under control by the cam follower and means connecting said servo with the governor control members, two concentric sleeves supported for movement axially of the carrier and each presenting at the end thereof adjacent the carrier a surface normal to the carrier axis and at the end remote from the carrier a helical cam surface, two motion transmitting parts supported by the carrier and respectively operatively connected with the cams and urged by the spring means into engagement respectively with the normal surface of said sleeves, a speed-schedule selecting lever having a hub supporting one end of the shaft and providing a helical cam surface for engaging the helical cam surfaces of the sleeves, inter-engaging longitudinal splines provided by the sleeves which fix them in such relation that their helical cams are angularly displaced while permitting relative axial movement of the sleeves, and means for preventing rotation of the outer sleeve while permitting axial movement thereof whereby the sleeves are moved in opposite directions by the speed lever.

6. Apparatus for controlling an aircraft engine having a throttle valve movable to different positions to control the supply of combustible mixture to said engine and the engine intake pressure, and operating a propeller having a pitch governor for maintaining a selected speed and a governor control member movable to different positions to select the speed to be maintained, said apparatus comprising a main control lever, an engine intake pressure selecting device actuated thereby, an element sensitive to engine intake pressure, a mechanism under control by the device and element for positioning the engine throttle valve to obtain the selected pressure, a speed cam carrier rotated by said lever, two cams pivotally supported by the carrier and having surfaces which merge adjacent the pivots of the cams with a cam surface provided by the carrier, cam follower engageable with the surfaces of the cams and the cam surface of the carrier, a speed-servo under control by the follower and means connecting said servo with the governor control member, and means for selectively positioning the cams for engagement by the cam follower.

7. Apparatus for controlling an aircraft engine having a throttle valve movable to different positions to control the supply of combustible mixture to said engine and the engine intake pressure, and operating a propeller having a pitch governor for maintaining a selected speed and a governor control member movable to different positions to select the speed to be maintained, said apparatus comprising a main control lever, an engine intake pressure selecting device actuated thereby, an element sensitive to engine intake pressure, a mechanism under control by the device and element for positioning the engine throttle valve to obtain the selected pressure, a speed cam carrier moved by said lever, two cams moving with the carrier, a cam follower engageable with the cams, a speed-servo under control by the cam follower and means connecting said servo with the governor control member, a speed-schedule selecting lever, means operated by movement of the speed lever for selectively positioning the cams for control of the cam follower, means for advancing spark timing from normal, and means under control by the main control lever and by the speed lever for rendering operative the spark-advancing means when certain pressures are selected by the main control lever and when the speed lever selects a certain one of the cams for control of the cam follower.

8. Apparatus for controlling an aircraft engine having a throttle valve movable to different positions to control the supply of combustible mixture to said engine and the engine intake pressure, and operating a propeller having a pitch governor for maintaining a selected speed and a governor control member movable to different positions to select the speed to be maintained, said apparatus comprising a main control lever, an engine intake pressure selecting device actuated thereby, an element sensitive to engine intake pressure, a mechanism under control by the device and element for positioning the engine throttle valve to obtain the selected pressure, a speed cam carrier moved by said lever, two cams moving with the carrier, a cam follower engageable with the cams, a speed-servo under control by the cam follower and means connecting said servo with the governor control member, a speed-schedule selecting lever, means operated by movement of the speed lever for selectively positioning the cams for control of the cam follower, a device for moving the governor control member to a feathering control position outside the range of positions effected by the speed-servo and independently of operation thereof, and means for effecting operation of said device in response to positioning the speed lever outside of its speed-schedule selecting range.

9. Apparatus for controlling an aircraft engine having a throttle valve movable to different positions to control the supply of combustible mixture to said engine and the engine intake pressure, an ignition timer, an engine starter and means for rendering the starter operative to start the engine; said apparatus comprising a main control lever, a throttle operating servo, a pressure selecting device operated by the lever, an element sensitive to engine intake pressure, means under control by the device and element for controlling the throttle operating servo, means for operating the ignition timer to effect spark retard from normal spark-timing, and means under control by the means for rendering the starter operative and by the main control lever when selecting a pressure for engine idling for rendering operative the means which operate the ignition timer to effect spark retard from normal timing.

10. Apparatus for controlling an aircraft engine having a throttle valve movable to different positions to control the supply of combustible mixture to the engine and the engine intake pressure and an ignition timer, and operating a propeller having a pitch governor for maintaining a selected speed and a governor control member movable to different positions to select a speed to be maintained; said apparatus comprising a main control lever, a throttle operating servo, a pressure selecting device operated by the lever, an element sensitive to engine intake pressure; means under control by the device and element for controlling the throttle servo, a servo for adjusting the ignition timer comprising a cylinder connected with a pressure oil source and a piston connected with the ignition timer to effect operation thereof, a spring which normally urges the piston into position for least spark advance, a port in the cylinder side wall which is uncovered by the piston when in position of normal spark advance, a cam carrier operated by the main control lever, two speed scheduling cams supported by the carrier, a cam follower engageable with said cams, a speed servo under control by the follower and connected with the governor control member, a speed schedule selecting lever, a mechanism operated thereby for rendering the cams selectively operative to engage the cam follower, a valve controlling the connection of said cylinder port with drain, said valve being open while one of the cams is selected for control of speed schedule, and means for closing the valve in response jointly to movement of the second lever to a position for selecting the other of said cams for control of speed schedule and to movement of the first lever into position for selecting certain intake pressures suitable for engine operation with the speed schedule selected by said other cam whereby spark advance is increased from normal timing.

11. Apparatus for controlling an aircraft engine having a throttle valve movable to different positions to control the supply of combustible mixture to the engine and the engine intake pressure and an ignition timer, and operating a propeller having a pitch governor for maintaining a selected speed and a governor control member movable to different positions to select a speed to be maintained; said apparatus comprising a main control lever, a throttle operating servo, a pressure selecting device operated by the lever, an element sensitive to engine intake pressure; means under control by the device and element for controlling the throttle operating servo, a servo for adjusting the ignition timer comprising a cylinder connected with a pressure oil source and a piston connected with the ignition timer to effect operation thereof, a spring which normally urges the piston into position for least spark advance, a cam carrier operated by the main control lever, two speed scheduling cams supported by the carrier, a cam follower engageable with said cams, a speed servo under control by the follower and connected with the governor control member, a speed schedule selecting lever, a mechanism operated thereby for rendering the cams selectively operative to engage the cam follower, a port in the cylinder side wall which is uncovered by the piston when in position of normal spark advance, a port in the cylinder which is uncovered by the piston when in position of a spark advance greater than for normal timing, a valve which selectively connects the ports with drain and which normally connects the first port with drain, means for injecting liquid into the engine fuel mixture, means for rendering operative the liquid injecting means, means responsive to functioning of the liquid injecting means for moving the valve to block connection of the first port with drain and to connect the second port with drain, a second valve for controlling the connection of either of the two ports with drain and normally opening while one of the cams is selected for control of speed schedule, and means for closing the valve in response jointly to movement of the second lever to a position for selecting the other of said cams for control of speed schedule and to movement of the first lever into position for selecting certain intake pressures suitable for engine operation with the speed schedule selected by said other cam whereby spark advance is increased to a value greater than for normal timing and for timing with liquid injection.

12. Apparatus for controlling an aircraft engine driving a propeller having blade pitch changing mechanism controlled by a governor having a control member for adjusting governed speed and driving a supercharger and a magneto and equipped with liquid injection apparatus; said apparatus comprising a main control lever, a throttle operating servo, a pressure selecting device operated by the lever, an intake pressure sensitive element, means under control by the device and element for controlling the throttle servo, a cam carrier moved by the lever, normal and cruise speed schedule cams supported by the carrier, a cam follower engageable with said cams, a speed servo under control by the cam follower and connected with the governor control member, mechanism including a lever for selectively positioning the cams for control of the cam follower, means for transmitting motion from the engine to the magneto and including three coaxial shafts connected by helical splines, an hydraulic servo for moving the intermediate one of the shafts axially to vary the spark-timing and including a movable piston connected with the intermediate shaft and a fixed cylinder having three ports in its side wall at varying distances from one end of the cylinder, a spring urging the piston toward said end of the cylinder and to a position where it leaves the first port uncovered, a first valve normally blocking discharge from the first port to drain and movable to a position to connect the first port with drain, a second valve normally blocking connection of the third port with drain and connecting the second port with drain movable into a position for blocking connection of the second port with drain and for connecting the third port with drain, a third valve normally keeping open the connection to drain from the second or third ports and movable into a position for preventing draining through the second and third ducts, solenoids respectively for moving the valves from normal status, a switch for rendering the first solenoid operative in response to movement of the main control lever to a position for selecting idling pressure, a switch for rendering operative the liquid injection apparatus and the second solenoid and a switch under joint control by the second lever when selecting the cruise speed schedule cam and by the first lever when selecting intake pressures suitable for cruising for rendering the third solenoid operative.

13. In apparatus for controlling the operation of an aircraft engine having a throttle valve movable to different positions to control the engine intake pressure, an ignition device and a timer therefor, means for controlling the throttle valve including a main control lever, a throttle operating servo-motor operable to move the throttle to different positions to control the intake pressure, a pressure selecting element movable by the control lever to select an intake pressure to be maintained, a device movable upon variations in engine intake pressure and means under control of the pressure selecting element and the last-named device for controlling the throttle operating servo-motor; mechanism for operating the ignition timer comprising a servo-motor for adjusting said timer having a cylinder connected with a source of oil under pressure, a piston slidable in said cylinder and operatively connected with the ignition timer, said piston being movable by the oil under pressure to control the ignition timing; a spring effective to move the piston in one direction and opposing movement thereof by oil pressure, a plurality of ports in the wall of the cylinder which are uncovered by the piston upon movement thereof and which are selectively connectible to an oil drain to determine the extent of piston movement, including a first port which if connected to the drain when uncovered by the piston will cause movement of the piston to stop when in position to effect a spark advance suitable for engine idling and a second port which if connected to the drain when uncovered by the piston will cause movement of the piston to stop when in position to effect normal spark advance, valve mechanism for selectively controlling connection of said ports to the drain, and means controlled by the main control lever to effect operation of said valve mechanism to connect said first port with the drain when said lever is positioned to select the pressure required for engine idling.

14. In apparatus for controlling the operation of an aircraft engine having a throttle valve movable to different positions to control the engine intake pressure, an ignition device and a timer therefor, means for controlling the throttle valve including a main control lever, a throttle operating servo-motor operable to move the throttle to different positions to control the intake pressure, a pressure selecting element movable by the control lever to select an intake pressure to be maintained, a device movable upon variations in engine intake pressure and means under control of the pressure selecting element and the last-named device for controlling the throttle operating servo-motor; mechanism for operating the ignition timer comprising a servo-motor for adjusting said timer having a cylinder connected with a source of oil under pressure, a piston slidable in said cylinder and operatively connected with the ignition timer, said piston being movable by the oil under pressure to control the ignition timing; a spring effective to move the piston in one direction and opposing movement thereof by oil pressure, a plurality of ports in the wall of the cylinder which are uncovered by the piston upon movement thereof and which are selectively connectible to an oil drain to determine the extent of piston movement, including a first port which if connected to the drain when uncovered by the piston will cause movement of the piston to stop when in position to effect normal spark advance, a second port which if connected to the drain when uncovered by the piston will cause movement of the piston to stop in a position to effect spark advance greater than normal, valve mechanism for selectively controlling connection of said ports to the drain, means for introducing an anti-detonant into the engine fuel mixture, and means responsive to operation of the last-named means to effect operation of said valve mechanism to connect said second port with the drain and block connection of the first port therewith.

References Cited in the file of this patent

UNITED STATES PATENTS

| Number | Name | Date |
|---|---|---|
| 1,897,537 | Sullivan et al. | Feb. 14, 1933 |
| 1,903,360 | Will | Apr. 4, 1933 |
| 2,031,527 | Dodson | Feb. 18, 1936 |
| 2,154,887 | Baker | Apr. 18, 1939 |
| 2,217,364 | Halford et al. | Oct. 8, 1940 |
| 2,238,889 | Kollman | Apr. 22, 1941 |
| 2,303,998 | Holley, Jr. | Dec. 1, 1942 |
| 2,306,733 | Joslyn | Dec. 29, 1942 |
| 2,343,378 | Kieser | Mar. 7, 1944 |
| 2,353,566 | Keller | July 11, 1944 |
| 2,389,003 | Schorn | Nov. 13, 1945 |
| 2,396,618 | Stieglitz et al. | Mar. 12, 1946 |
| 2,398,319 | Maddox | Apr. 9, 1946 |
| 2,400,830 | Kinnucan et al. | May 21, 1946 |
| 2,450,834 | Lee, 2d | Oct. 5, 1948 |
| 2,480,758 | Mock et al. | Aug. 30, 1949 |
| 2,503,274 | Jorgensen et al. | Apr. 11, 1950 |
| 2,555,784 | Catford | June 5, 1951 |

FOREIGN PATENTS

| Number | Country | Date |
|---|---|---|
| 182,338 | Great Britain | July 6, 1922 |
| 883,676 | France | Mar. 29, 1943 |